(12) United States Patent
Matsumoto et al.

(10) Patent No.: US 7,587,065 B2
(45) Date of Patent: *Sep. 8, 2009

(54) IMAGE ANALYSIS METHOD, ANALYZING MOVEMENT OF AN OBJECT IN IMAGE DATA

(75) Inventors: Nobuyuki Matsumoto, Kawasaki (JP); Osamu Hori, Yokohama (JP); Takashi Ida, Kawasaki (JP); Hidenori Takeshima, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/041,247

(22) Filed: Mar. 3, 2008

(65) Prior Publication Data

US 2008/0175441 A1 Jul. 24, 2008

Related U.S. Application Data

(62) Division of application No. 10/638,806, filed on Aug. 12, 2003, now abandoned.

(30) Foreign Application Priority Data

Sep. 26, 2002 (JP) .............................. 2002-281206
May 14, 2003 (JP) .............................. 2003-136385

(51) Int. Cl.
*G06K 9/00* (2006.01)

(52) U.S. Cl. ....................................... 382/103; 382/107

(58) Field of Classification Search .................. 382/100, 382/103, 107; 434/247, 252, 256, 257
See application file for complete search history.

(56) References Cited

U.S. PATENT DOCUMENTS 5,111,410 A    5/1992  Nakayama et al.
5,904,484 A    5/1999  Burns
5,947,742 A    9/1999  Katayama
6,335,985 B1   1/2002  Sambonsugi et al.
6,514,081 B1   2/2003  Mengoli
6,999,103 B2   2/2006  Matsumoto et al.
7,050,070 B2   5/2006  Ida et al.
7,123,275 B2  10/2006  Takeshima et al.
2005/0046729 A1  3/2005  Taguchi et al.
2005/0162417 A1  7/2005  Taguchi et al.
2006/0176319 A1  8/2006  Ida et al.

(Continued)

FOREIGN PATENT DOCUMENTS

JP          62-044275          2/1987

(Continued)

OTHER PUBLICATIONS

U.S. Appl. No. 09/692,457, filed Oct. 20, 2000, Ida et al.

(Continued)

*Primary Examiner*—Brian Q Le
(74) *Attorney, Agent, or Firm*—Oblon, Spivak, McClelland, Maier & Neustadt, P.C.

(57) ABSTRACT

An image analysis method for analyzing the motion of an object by using the time-series image data. The method comprises inputting time-series image data, generating time-series object image data by extracting an object region from the time-series image data, and analyzing the motion of the object from the time-series object image data.

2 Claims, 24 Drawing Sheets

U.S. PATENT DOCUMENTS

2006/0209087 A1  9/2006  Takeshima et al.

FOREIGN PATENT DOCUMENTS

| JP | 03-012180 | 1/1991 |
| JP | 08-182786 | 7/1996 |
| JP | 8-241414 | 9/1996 |
| JP | 09-185716 | 7/1997 |
| JP | 9-322153 | 12/1997 |
| JP | 3050448 | 4/1998 |
| JP | 2001-14477 | 1/2001 |
| JP | 2002-210055 | 7/2002 |

OTHER PUBLICATIONS

N. Yagi, et al., Nihon Kougyou Shuppan, vol. 9, No. 4, pp. 55-60, "Multi Motion", Apr. 1998.

Sang Gil Lee, et al. Visualization System for Gymnast's Form and Locus—Multi-Motion, The Journal of the Institute of Image Information and Television Engineers, The Institute of Image Information and Television Engineers, vol. 51, Edition 11, 1997, pp. 1881-1887.

Sang Gil Lee, et al. Visualization Systems for Gymnast's Form and Locus - Multi-Motion, The Journal of the Institute of Image Information and Television Engineers, The Institute of Image Information and Television Engineers, vol. 51, Edition 11, 1997, pp. 1881-1887.

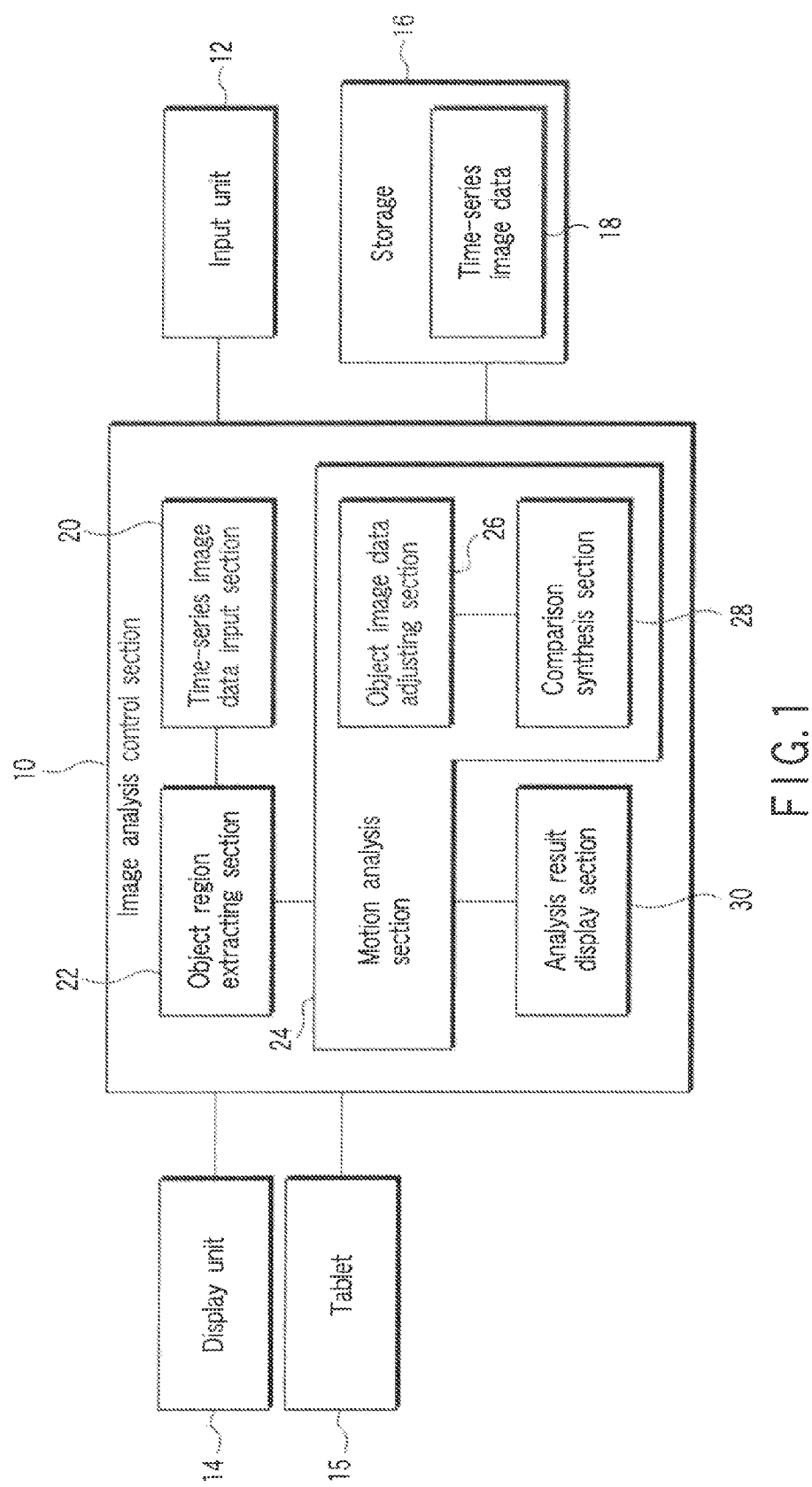
F I G. 1

US 7,587,065 B2

IMAGE ANALYSIS METHOD, ANALYZING MOVEMENT OF AN OBJECT IN IMAGE DATA

CROSS-REFERENCE TO RELATED APPLICATIONS

This application is a divisional of U.S. application Ser. No. 10/638,806 filed Aug. 12, 2003, and is based upon and claims the benefit of priority from the prior Japanese Patent Applications Nos. 2002-281206 and 2003-136385, filed Sep. 26, 2002 and May 14, 2003, respectively, the entire contents of each of which are incorporated herein by reference.

BACKGROUND OF THE INVENTION

1. Field of the Invention

The present invention relates to an image analysis method, apparatus and program for analyzing the movement of an object from images thereof contained in time-series image data.

2. Description of the Related Art

In general, a technique for focusing on a certain object in an image and analyzing the movement of the object is an important technique concerning images. This technique is utilized to provide TV viewers with effective synthesized images during a sports program, or to analyze the movement of players in a tennis or golf school for quantitative instruction, or to enhance the techniques of athletes.

"Multi-motion–Gymnast Form/Trajectory Display System" (Image Laboratory, vol. 9, no. 4, pp. 55-60, published by Nippon Kogyo Publisher on April 1998) is a conventional example of a technique for analyzing the movement of an object from images thereof contained in time-series image data.

In this technique, firstly, only the region (object region) including a target object is extracted from time-series image data. The object region is extracted by, for example, computing differences between frames and digitizing a region of a large difference. Further, the object region can be extracted by a chroma-key method for pre-photographing a moving object using a one-color background, and extracting the object region utilizing a difference in color, or a manual method for inputting the outline of an object extracted by a user's operation with a mouse or graphic tablet, or a method for automatically correcting the rough outline of an object input by a user, as disclosed in Jpn. Pat. Appln. KOKAI Publication No. 2001-14477.

As described above, only an object is extracted from time-series image data, to thereby create object image data comprising time-series images of an object region.

After that, the time-series object image data items are superposed and synthesized in order, thereby creating a time-series image synthesized in a stroboscopic manner.

Thus, the trajectory of an object can be grasped from the display of synthesized time-series object image data. In other words, the movement of the object can be visually analyzed.

However, the image analysis method of displaying extracted time-series object image data items superposed on each other only enables viewers to see the movement of an object as successive images. This analysis is just a qualitative analysis as to how the position of the object changes, but not a quantitative analysis as to the degree of change in the position of the object.

BRIEF SUMMARY OF THE INVENTION

An advantage of an aspect of the present invention is to provide an image analysis method, apparatus and program capable of analyzing the movement of an object in a quantitative manner from images thereof contained in time-series image data.

According to an aspect of the preset invention, there is provided an image analysis method comprising: inputting time-series image data; generating time-series object image data by extracting an object region from the time-series image data; and analyzing motion of an object from the time-series object image data.

BRIEF DESCRIPTION OF THE SEVERAL VIEWS OF THE DRAWING

FIG. 1 is a block diagram illustrating an image analysis apparatus according to an embodiment of the invention;

DETAILED DESCRIPTION OF THE INVENTION

Figure 2:
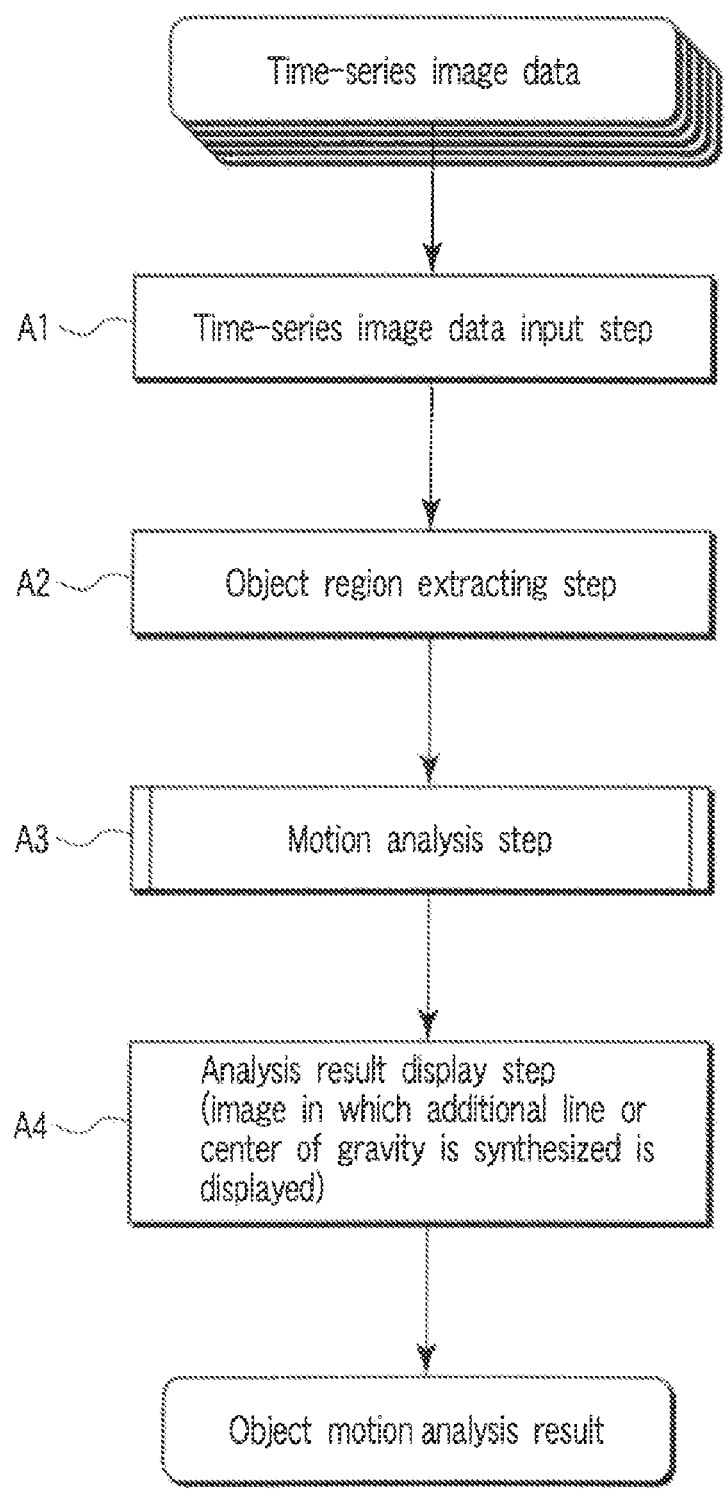
FIG. 2 is a flowchart useful in explaining an image analysis method according to a first embodiment.
Figure 3A:
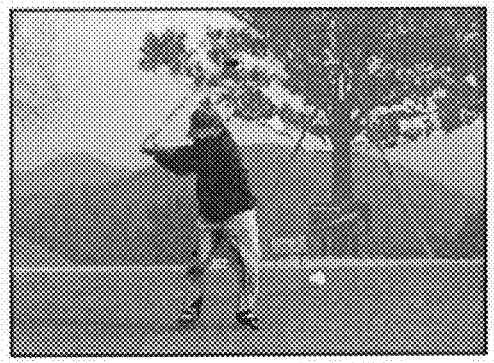
FIGS. 3A, 3B, 3C, 3D, 3E and 3F are views illustrating examples of time-series data items.
Figure 3B:
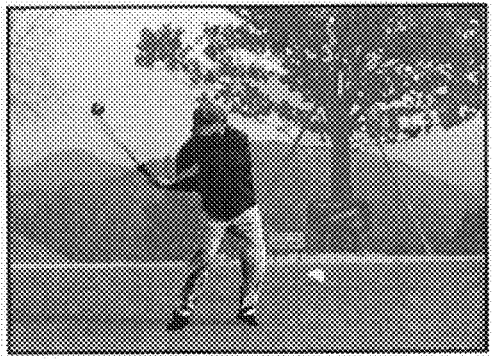
Figure 3C:
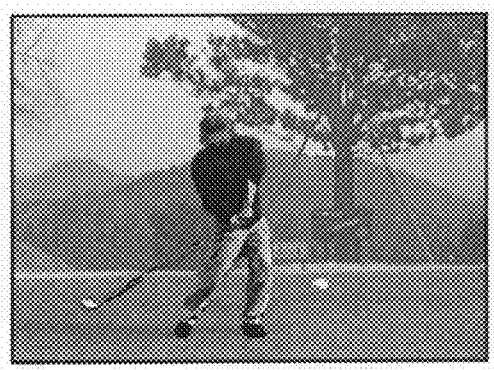
Figure 3D:
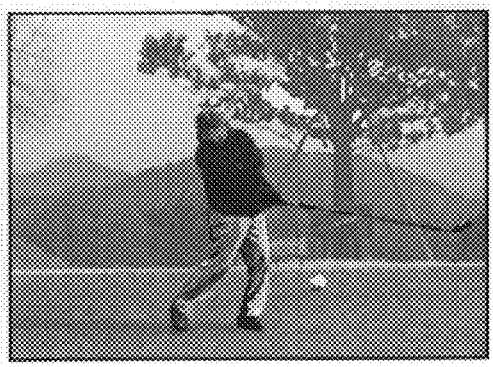
Figure 3E:
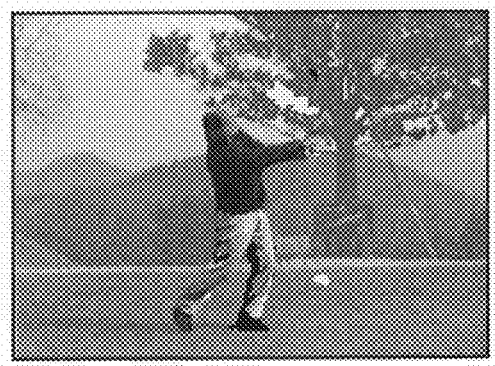
Figure 3F:
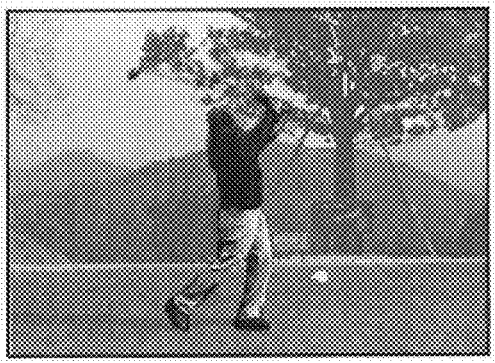

Embodiments of the invention will be described in detail with reference to the accompanying drawings. FIG. 1 is a block diagram illustrating the configuration of an image analysis apparatus according to the invention. The image analysis apparatus of the invention is formed of, for example, a computer that executes an image analysis program recorded in a recording medium, such as a semiconductor memory, CD-ROM, DVD, magnetic disk, etc., and is controlled by the executed program. This computer contains a processor, a memory accessed by the processor, and an image analysis program stored in the memory.

As seen from FIG. 1, the image analysis apparatus of the invention comprises an image analysis control section 10, input unit 12, display unit 14, tablet 15 and storage 16.

The image analysis control section 10 has a function for receiving time-series image data from the input unit 12 or storage 16, and quantitatively analyzing the motion of an object from images thereof contained in the time-series image data. This function includes a function for measuring a change in the movement of an object, the speed of a particular point in the object, the trajectory of the particular point, the angle (curvature) or region defined in an image when the particular point moves, and also a function for digitizing or graphing them to analyze them.

The image analysis control section 10 is a function realized by executing, using the processor, the image analysis program stored in the memory. The image analysis control section 10 comprises function sections, such as a time-series image data input section 20, object region extracting section 22, motion analysis section 24 (object image data adjusting section 26, comparison analysis section 28), analysis result display section 30, etc. Each function section executes the following processing.

The time-series image data input section 20 receives time-series image data as an analysis target from the input unit 12 (image pickup means) or storage 16. The time-series image data input section 20 measures the position of a particular point of an object while attaching characterizing color data to data corresponding to the particular point, or picking up image data of the object (seventh embodiment).

The object region extracting section 22 extracts an object region as a motion analysis target from the time-series image data input by the time-series image data input section 20, thereby generating object image data.

The motion analysis section 24 performs a motion analysis of an object on the basis of information concerning the shape of the object region contained in the time-series object image data generated by the object region extracting section 22. In the motion analysis, the motion analysis section 24 performs the following processing—superposition and synthesis of background image data formed of additional line data and the time-series object image data, detection of the position of the center of gravity in an object region contained in the time-series object image data, superposition and synthesis of two time-series object image data items (first and second object image data items), superposition and synthesis of the line indicative of the trajectory of the object region (particular point) of the object image data, and the time-series object image data, detection of the movement speed of the particular point, computation of the curvature of the trajectory of the particular point, measurement of the closed region defined by the trajectory of the particular point, computation of the inclination of the trajectory of the particular point, etc.

The motion analysis section 24 comprises an object image data adjusting section 26 and comparison analysis section 28. The object image data adjusting section 26 performs deformation processing on the two time-series object image data items (first and second object image data items) extracted by the object region extracting section 22. The comparison analysis section 28 superposes and synthesizes the two time-series object image data items (first and second object image data items).

The analysis result display section 30 displays the analysis result of the motion analysis section 24. For example, the analysis result display section 30 synthesizes and displays time-series object image data, and displays the analysis result using a numerical value or graph.

The input unit 12 comprises a keyboard for inputting, for example, user's control instructions to the image analysis apparatus, a pointing unit, such as a mouse, and image pickup means, such as a video camera, for inputting time-series image data to be analyzed.

The display unit 14 displays, for example, the analysis result of the image analysis control section 10, object image data synthesized by the comparison synthesis section 28, and an analysis result digitized or graphed by the analysis result display section 30.

The tablet 15 is used by a user to perform an input operation for analyzing an object included in an image in the image analysis control section 10, and allows a pen to point the position of the object in the image. The tablet 15 is superposed on the display surface of the display unit 14, and hence the user can directly designate a position on an image that is displayed on the display unit 14.

The storage 16 stores time-series image data 18 to be analyzed, as well as various programs and data items. The time-series image data 18 includes first and second time-series image data items corresponding to different objects.

The embodiments of the invention will now be described.

First Embodiment

FIG. 2 is a flowchart useful in explaining an image analysis method according to a first embodiment. In FIG. 2, step A1 is a time-series image data input step for inputting time-series image data. Step A2 is an object region extracting step for extracting an object region from time-series image data to thereby generate time-series object image data. Step A3 is a motion analysis step for analyzing the motion of an object on the basis of shape information contained in the generated time-series object image data. Step A4 is an analysis result display step for displaying an analysis result obtained at the motion analysis step.

Firstly, at the step A1 at which time-series image data is input by the time-series image data input section 20, time-series image data obtained by, for example, the input unit 12 (image pickup means such as a video camera), or time-series image data 18 prestored in the storage 16 is input. At this step, the time-series image data as shown in FIGS. 3A-3F is input. The time-series image data of FIGS. 3A-3F is obtained by photographing a player swinging a golf club. Assume that the player and golf club are to-be-analyzed objects in the time-series image data.

Subsequently, at the step A2 at which an object region is extracted by the object region extracting section 22, it is extracted from the time-series image data shown in FIGS. 3A-3F, thereby generating time-series object image data shown in FIGS. 4A-4F. Time-series object image data is obtained by dividing, for example, the time-series image data shown in FIG. 3A into a background portion and object region portion (the player and golf club), and extracting the object region portion. The object image data contains color information and shape information concerning an object image. In the time-series object image data shown in FIGS. 4A-4F, assume that the player portion is partitioned from the golf club portion. The time-series object image data of FIGS. 4A-4F is generated by daubing the portion other than the object region portion on the basis of the shape information.

Figure 4A:
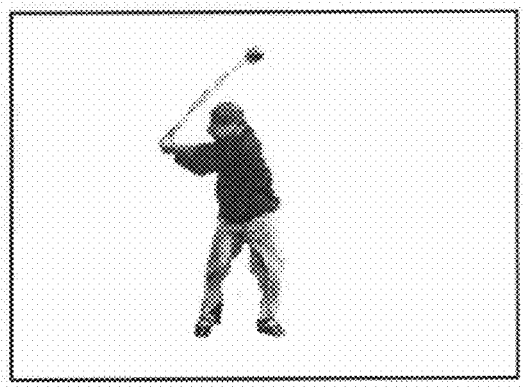
FIGS. 4A, 4B, 4C, 4D, 4E and 4F are views illustrating other examples of time-series data items.
Figure 4B:
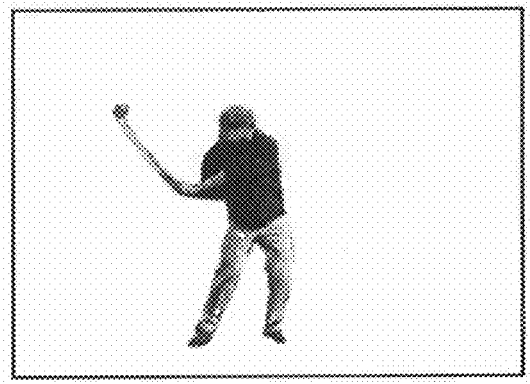
Figure 4C:
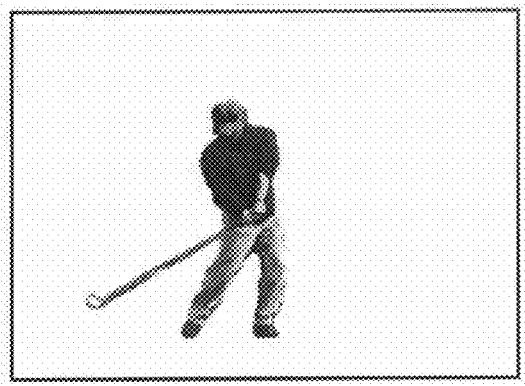
Figure 4D:
Figure 4E:
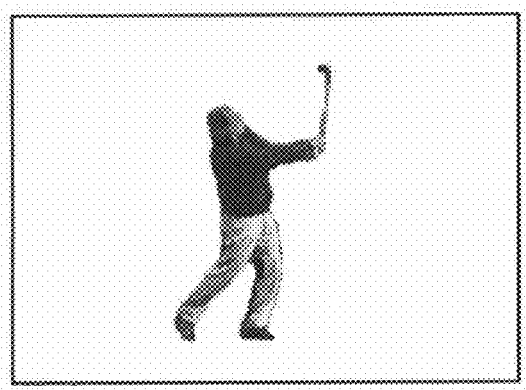
Figure 4F:
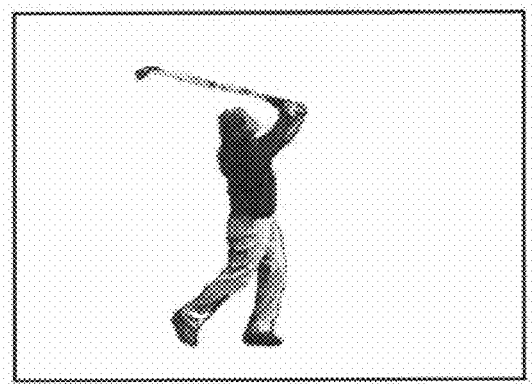
Figure 5:
FIG. 5 is a view illustrating an example of an image obtained by superposing, upon an initial frame of time-series image data, object image data extracted from each item of the image data.

FIG. 5 is a view illustrating an example of an image obtained by superposing, upon an initial frame of time-series image data, object image data extracted from each item of the image data (the time-series image data in this case does not correspond to that shown in FIGS. 4A-4F). In FIGS. 3 and 4, although the time-series image data (object image data) is thinned out for facilitating the description, a larger number of time-series image data items (object image data items) are actually used, as is understood from FIG. 5 in which a larger number of time-series image data items are superposed. The number of frames of time-series image data per unit time can be determined on the basis of the contents of image analysis, described later. Further, at the analysis result display step, described later, a plurality of object image data items are displayed superposed on each other. In this step, however, the object image data may be thinned out to make it easy to see the displayed image. Further, for facilitating the following description, the drawings in which time-series image data (object image data) is thinned out will be referred to.

As a method for extracting an object region, the following may be utilized: a method for computing differences between frames and digitizing a region of a large difference to extract an object region; a chroma-key method for pre-photographing a moving object using a one-color background, and extracting the object region utilizing a difference in color; a manual method for inputting the outline of an object extracted by a user's operation with a mouse or graphic tablet; or a method for automatically correcting the rough outline of an object input by a user, as disclosed in Jpn. Pat. Appln. KOKAI Publication No. 2001-14477. At the object region extracting step (step A2), the object region is extracted from image data utilizing a certain method.

After that, at the step A3 at which a motion analysis is performed by the motion analysis section 24, the motion of the object is analyzed from shape information contained in the extracted time-series object image data.

Figure 6:
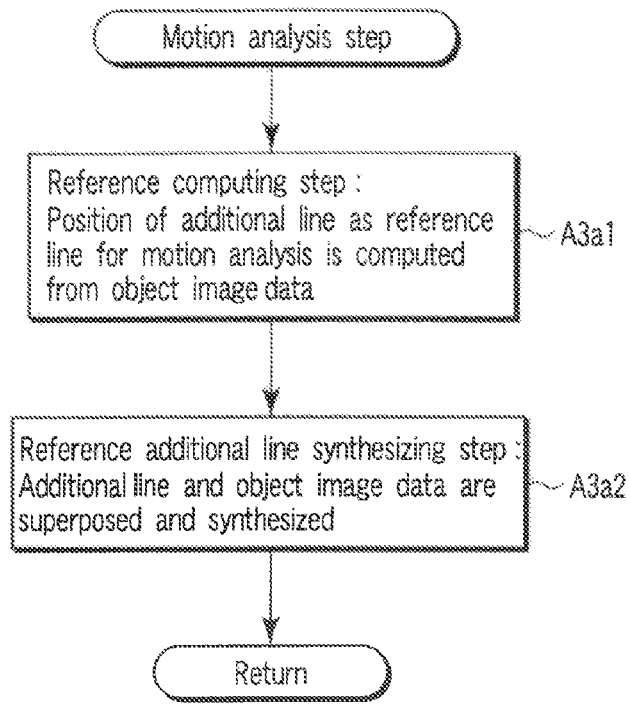
FIG. 6 is a flowchart useful in explaining a motion analysis step employed in the first embodiment.

FIG. 6 is a flowchart useful in explaining the motion analysis step employed in the first embodiment.

In an object motion analysis, in most cases, if the trajectory of motion is observed while it is compared with a certain reference line, the characteristics of the motion can be clearly seen.

In the case of, for example, golf swing, it is considered desirable to twist the body about the backbone when swinging a golf club. Therefore, it is important for the analysis of a swing whether or not the swing axis is kept constant during the swing motion.

Firstly, the motion analysis section 24 computes, in a reference computing step, the position of a reference line for the motion on the basis of object image data generated at the object region extracting step (step A3*a*1). In the case of image data corresponding to a golf swing, the swing axis of an object (player) is detected from shape information contained in, for example, the object image data as shown in FIG. 4A. Assume that the swing axis of the object corresponds to a vertical line that passes through the position of the center of gravity in an object region contained in the object image data shown in, for example, FIG. 4A (the initial frame). The motion analysis section 24 computes the position of the center of gravity in the object region from shape information (concerning a player) contained in the object image data, thereby obtaining the vertical line passing through the position of the center of gravity.

Subsequently, the motion analysis section 24 synthesizes, in a reference-additional-line synthesis step, superposes and synthesizes the object image data and an additional line indicative of the swing axis utilizing the position computed at the reference computing step (step A3*a*2).

Figure 7A:
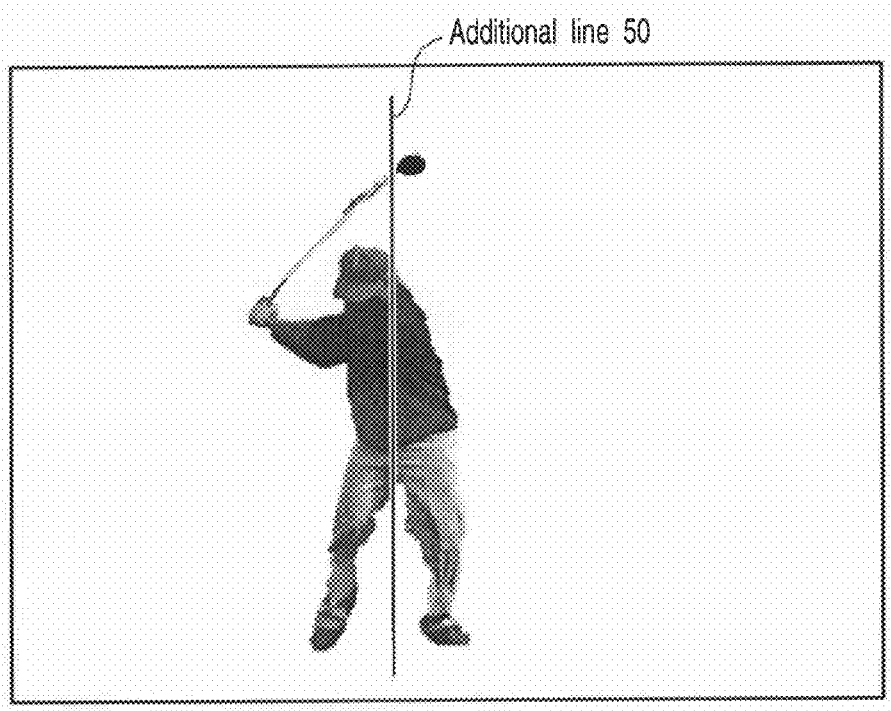
FIGS. 7A and 7B are views illustrating a state in which additional lines (swing axes) are superposed in the motion analysis step of the first embodiment.

FIG. 7A illustrates an image obtained by synthesizing the initial frame of the object image data and an additional line 50 so that the line vertically passes through the position of the center of gravity in the object region.

The position of the additional line 50 may be determined not only from the object region in the initial frame, but also utilizing any one of the frames ranging from the initial one to final one. For example, the frame in which the head of the club hits a ball, or a frame near this frame is detected, and the additional line is determined on the basis of this frame. The frame near the hit time can be detected by detecting, for example, object image data indicating that the head of the golf club is lowest. Further, the club head can be detected if it is designated as a particular point, as in a fourth embodiment described later.

The analysis result display section 30 sequentially superposes and synthesizes time-series object image data items, each of which is obtained by synthesizing object image data and the additional line 50 in the reference additional line synthesis step using the motion analysis section 24. The display section 30 displays the synthesized object image data on the display unit 14. Thus, the image as shown in FIG. 7B, obtained by synthesizing a plurality of time-series object image data items and the additional line 50 to be referred to when a movement of an object is determined, is displayed on the display unit 14.

Figure 7B:
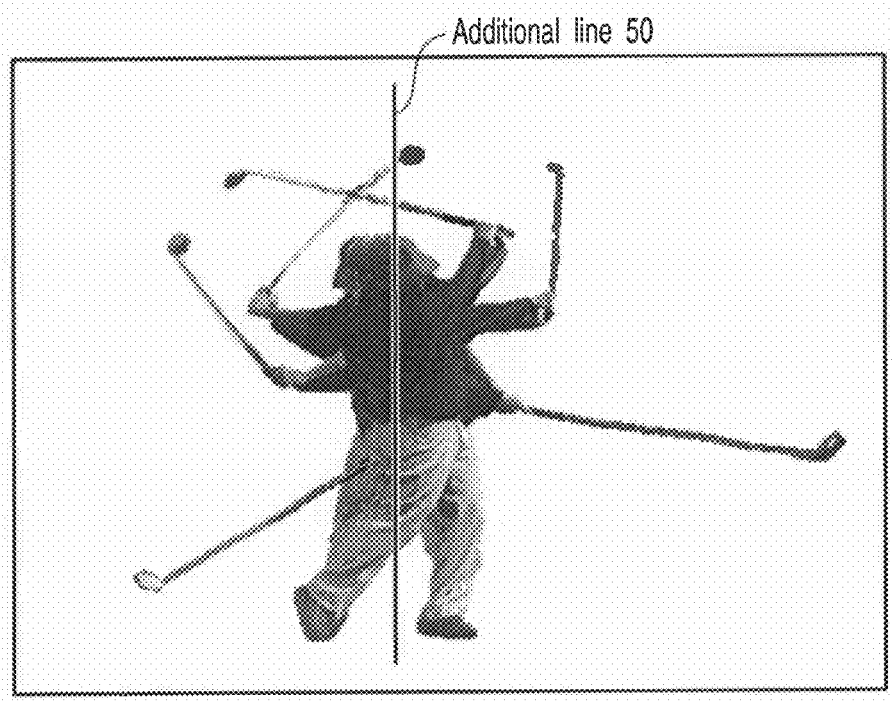

Various additional lines other than the additional line 50 indicative of the swing axis shown in FIGS. 7A and 7B can be synthesized with object image data for assisting the motion analysis of an object.

Figure 8A:
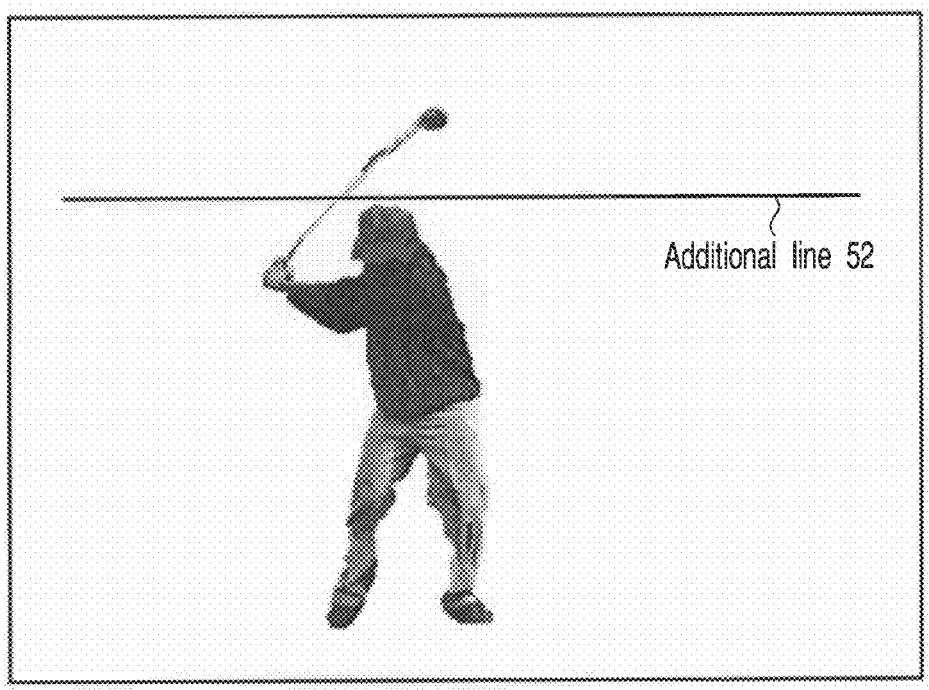
FIGS. 8A and 8B are views illustrating a state in which additional lines (upper ends of objects) are superposed in the motion analysis step of the first embodiment.

For example, the upper end of the object (the top of the head) is detected from the shape information (concerning the player) contained in the object image data shown in FIG. 4A, thereby displaying, as an additional line 52, the horizontal line touching the top of the head, as shown in FIG. 8A. With reference to the additional line 52, the vertical movement of the head during a swing can be determined.

The upper end of the object (the tope of the head) can be detected, for example, in the following manner. The motion analysis section 24 horizontally scans, for example, the initial frame of object image data, beginning from the uppermost portion of the frame, thereby detecting an object image. When the object image is detected, it is determined whether the object image is the head or part of the golf club. The object image corresponding to the golf club (club head or shaft) is much narrower than the object image corresponding to the head, from which whether the object image is the head or part of the golf club is determined. For example, when the object image data shown in FIG. 4A is horizontally scanned beginning from the uppermost portion, the object image corresponding to the golf club is detected before the image corresponding to the head. In this case, when an object image other than that corresponding to the golf club is detected, it can be determined to correspond to the head.

Further, concerning the golf club, its color may be pre-stored so that it can be determined from the color of a detected object image, whether or not the object image corresponds to the golf club, as will be described in detail in the fourth embodiment.

Furthermore, when the horizontal additional line 52 is displayed, the position of the additional line 52 may be determined not only from the object region in the initial frame, but also utilizing any one of the frames ranging from the initial one to final one.

Figure 8B:
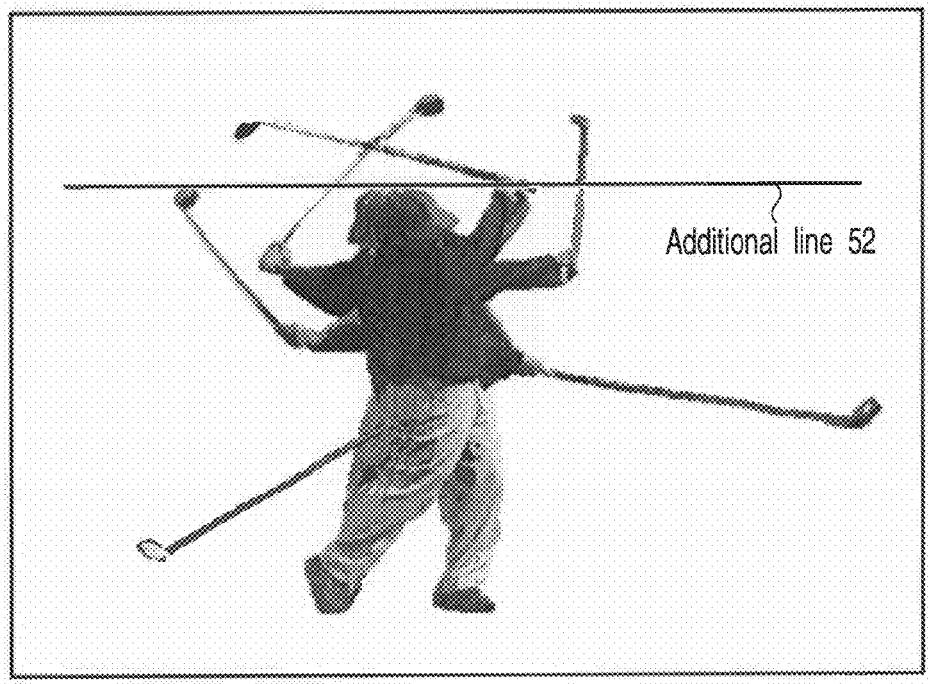

As a result, as shown in FIG. 8B, an image obtained by synthesizing a plurality of time-series object image data items and the horizontal additional line 52 to be referred to when a movement of an object is determined, is displayed on the display unit 14.

Figure 9:
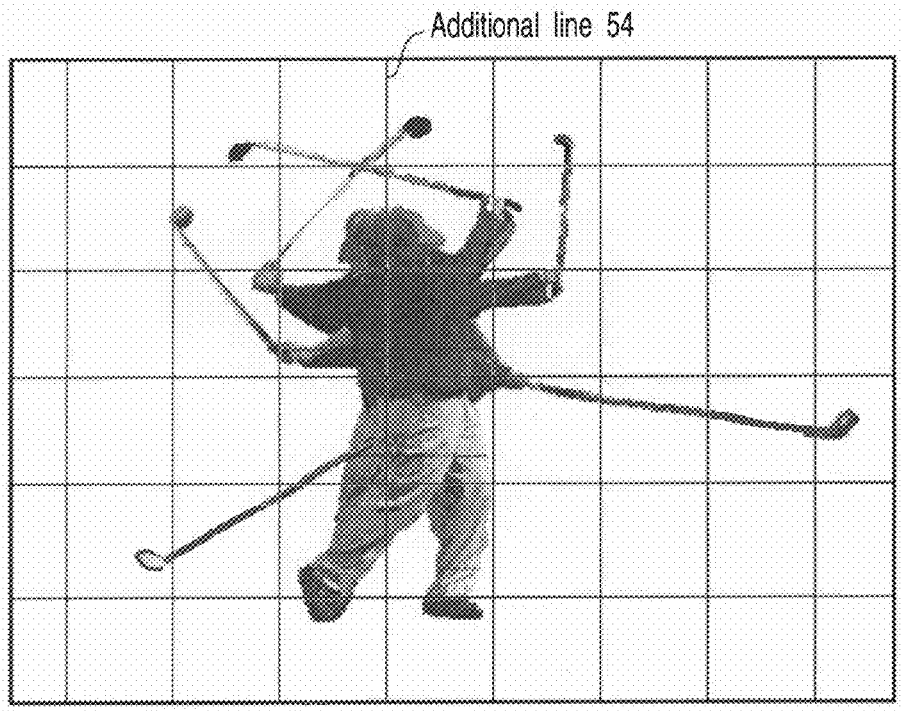
FIG. 9 is a view illustrating a state in which additional lines (lattice lines) are superposed in the motion analysis step of the first embodiment.
Figure 10:
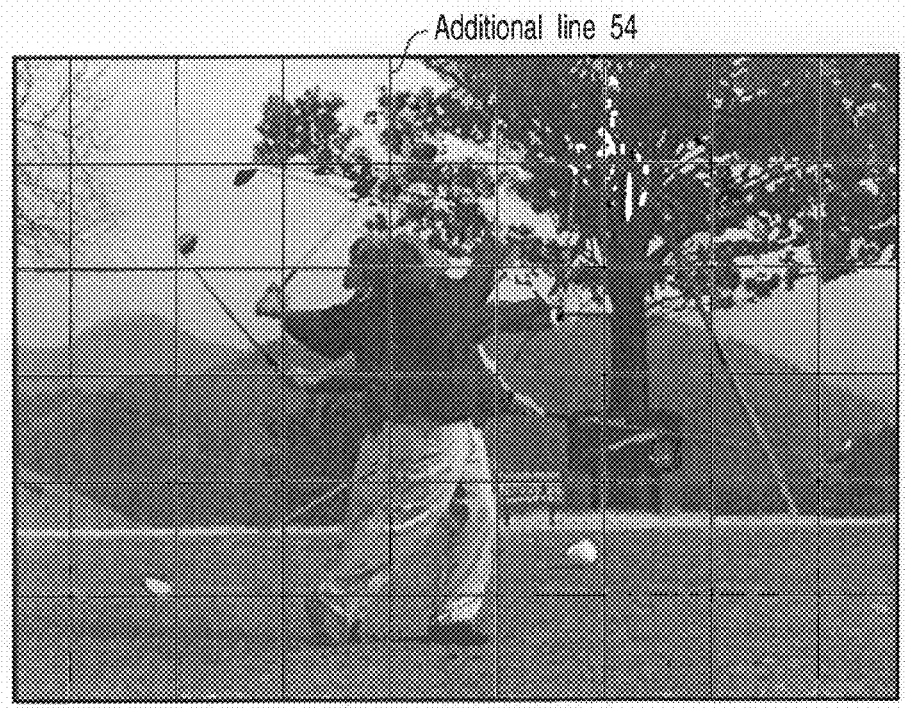
FIG. 10 is a view illustrating a state in which additional lines (lattice lines) are superposed in a background in the motion analysis step of the first embodiment.
Figure 12A:
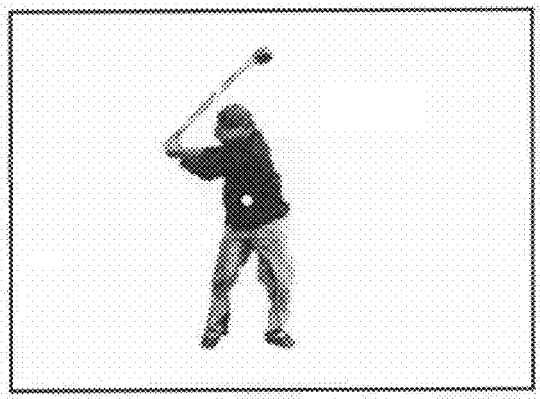
FIGS. 12A, 12B, 12C, 12D, 12E and 12F are views illustrating time-series object image data items obtained in the motion analysis step of the second embodiment, each object image data item containing a point indicative of the center of gravity.
Figure 12B:
Figure 12C:
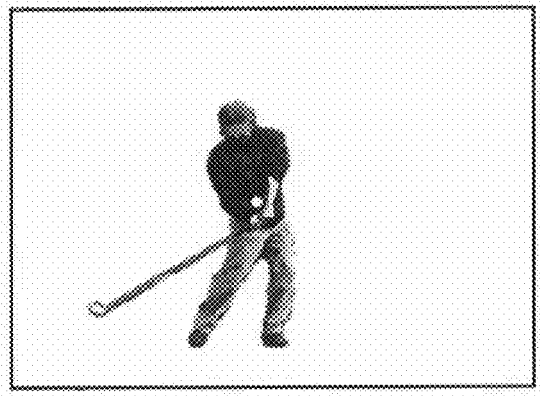
Figure 12D:
Figure 12E:
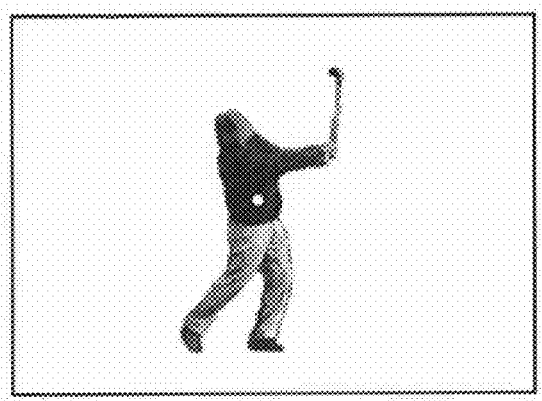
Figure 12F:
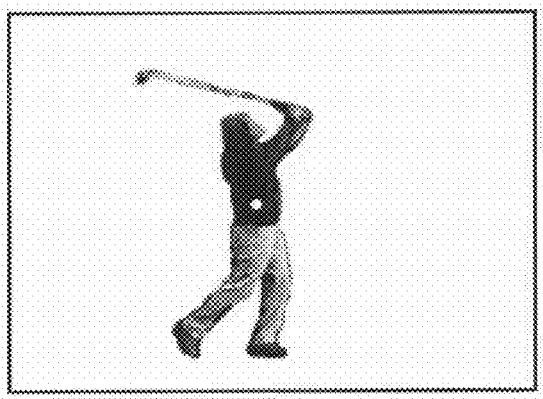

Also, additional lines 54 arranged in the form of a lattice and time-series object image data may be superposed and synthesized for analyzing the motion of an object, as shown in FIG. 9 or 10 (in the case of FIG. 10, the additional lines 54 and time-series object image data are superposed on the first frame of time-series image data that contains background data).

The position of one of the vertical lines included in the additional lines 54 shown in FIG. 9 or 10 may be identical to that of the additional line 50 shown in FIG. 7A or 7B. Similarly, the position of one of the horizontal lines included in the additional lines 54 may be identical to that of the line 52 shown in FIG. 8A or 8B.

In addition, in FIGS. 7, 8, 9 and 10, the additional line(s) 50, 52, 54 is superposed on an image obtained by sequentially superposing time-series object image data items. However, an image obtained by sequentially superposing time-series object image data items may be superposed on the additional line(s) 50, 52, 54.

As described above, in the first embodiment, synthesis of an additional line and time-series object image data enables the motion of an object to be quantitatively analyzed from images of the object contained in time-series image data. In other words, with reference to the additional line(s) 50, 52, 54, a movement of a player who is swinging a golf club can be measured.

Second Embodiment

In a second embodiment, the position of the center of gravity in an object region extracted as time-series object image data is detected and used for the motion analysis of the object in a motion analysis step similar to that of the first embodiment.

Figure 11:
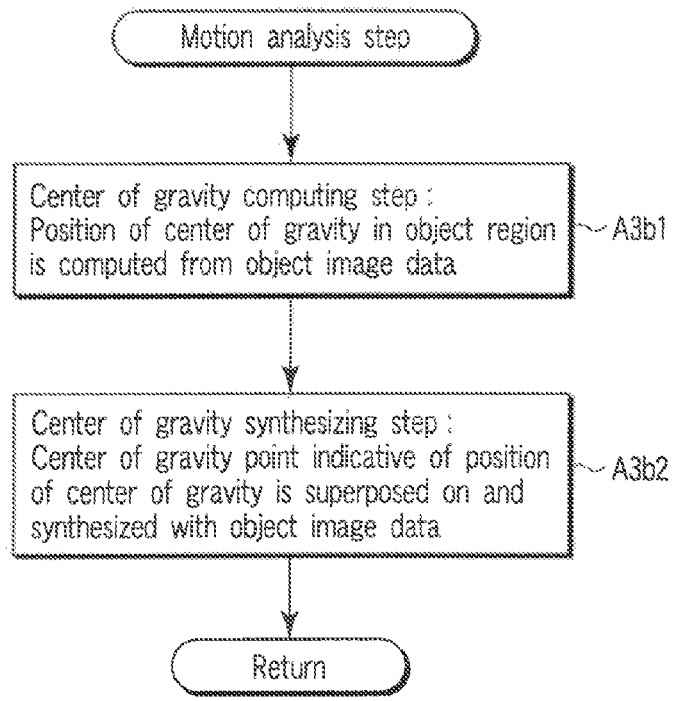
FIG. 11 is a flowchart useful in explaining a motion analysis step employed in a second embodiment.

FIG. 11 is a flowchart useful in explaining the motion analysis step employed in the second embodiment.

In a center-of-gravity computing step, the motion analysis section 24 computes the position of the center of gravity in an object region from time-series object image data that is extracted from time-series image data by the object region extracting section 22 (step A3*b*1), thereby superposing the point (center-of-gravity point) indicative of the position of the center of gravity contained in object image data to obtain synthesis image data (step A3*b*2).

Figure 13A:
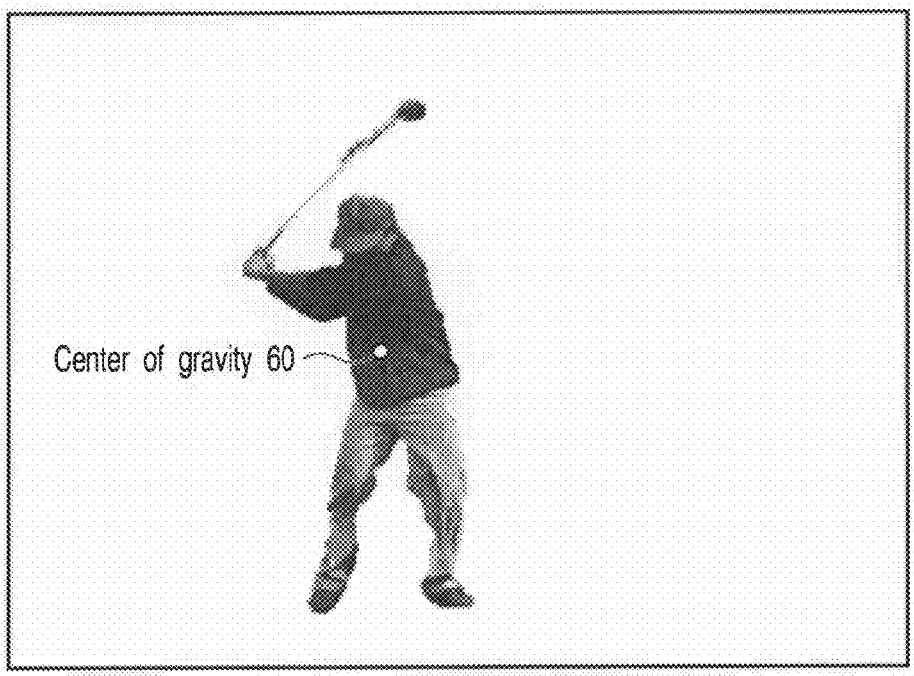
FIGS. 13A and 13B are views useful in explaining a motion analysis performed in the motion analysis step of the second embodiment, utilizing changes in the center of gravity.
Figure 13B:
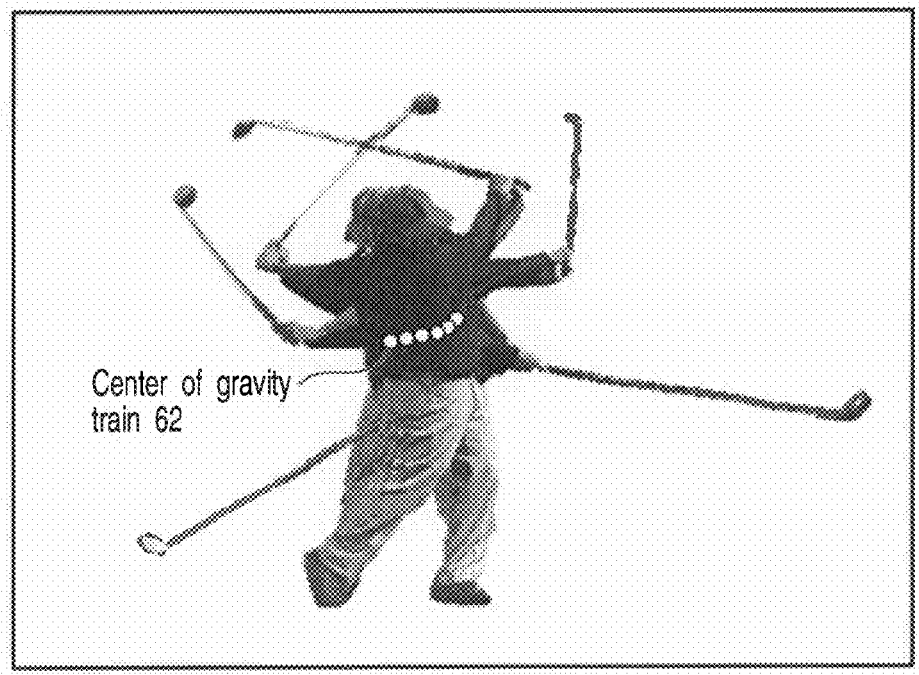

FIGS. 12A-12F are views illustrating time-series object image data items obtained in the motion analysis step of the second embodiment, each object image data item containing a point indicative of the center of gravity. The analysis result display section 30 displays, on the display unit 14, the position of the center of gravity in an object region included in each frame of time-series object image data, the position of the center of gravity being set as a center-of-gravity point 60 as shown in FIG. 13A. Alternatively, the analysis result display section 30 sequentially superposes and synthesizes time-series object image data items, and displays a center-of-gravity-point train 62 as shown in FIG. 13B. As a result, changes in the center of gravity with time can be visually confirmed.

Figure 14A:
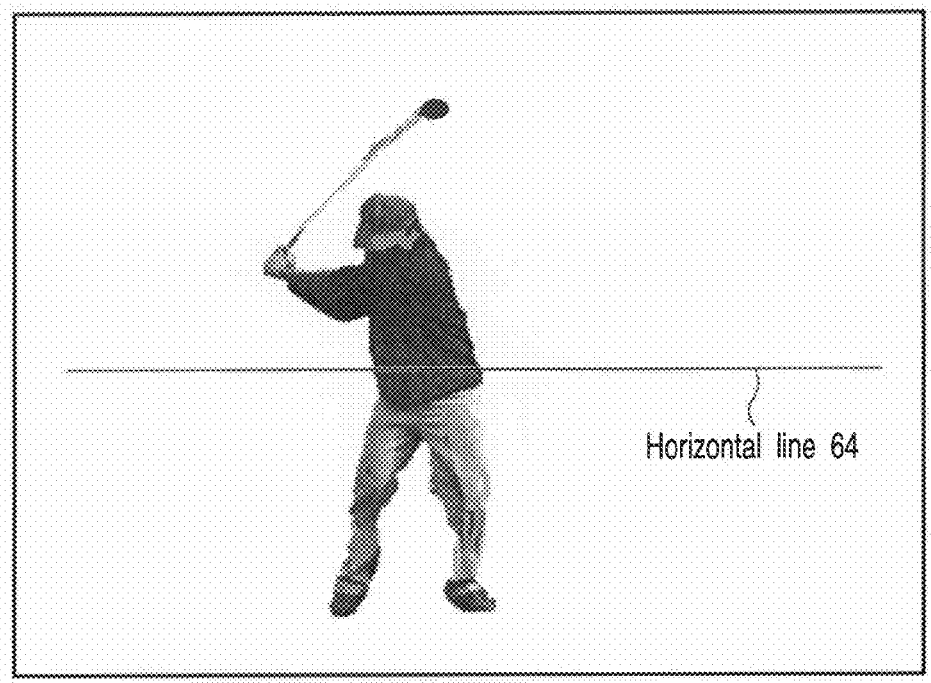
FIGS. 14A and 14B are views useful in explaining a vertical-motion analysis performed in the motion analysis step of the second embodiment, utilizing changes in the center of gravity.
Figure 14B:
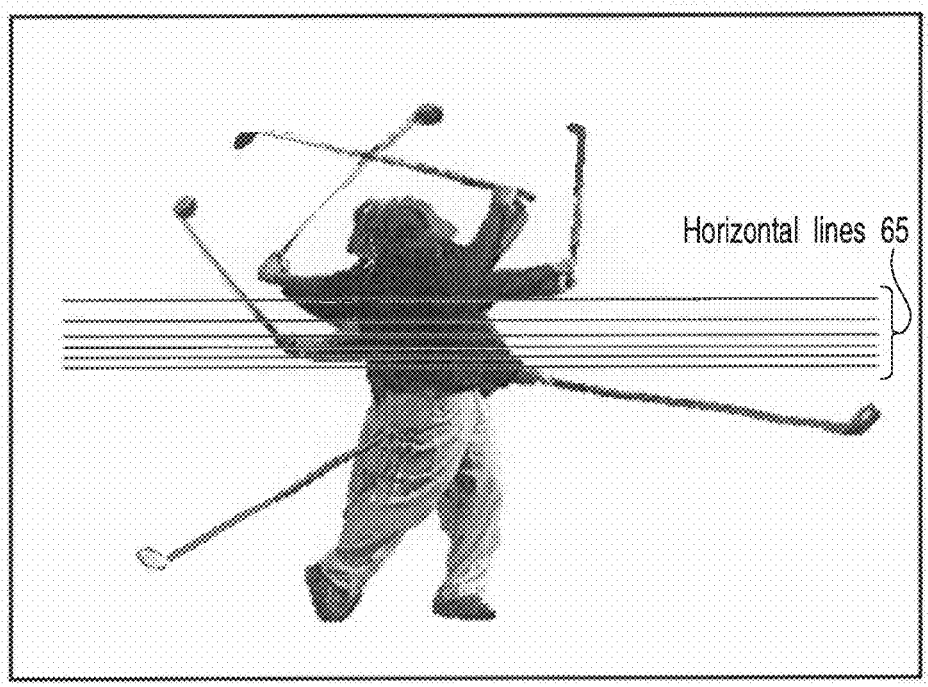

Further, to enable vertical changes in the center of gravity to be confirmed, object image data can be displayed together with a horizontal additional line that passes through the position of the center of gravity in the object region of the object image data. FIG. 14A (14B) shows the case where a horizontal line 64 (horizontal lines 65) that passes through the center-of-gravity point 60 (center-of-gravity point train 62) shown in FIG. 13A (13B) is added.

Figure 15A:
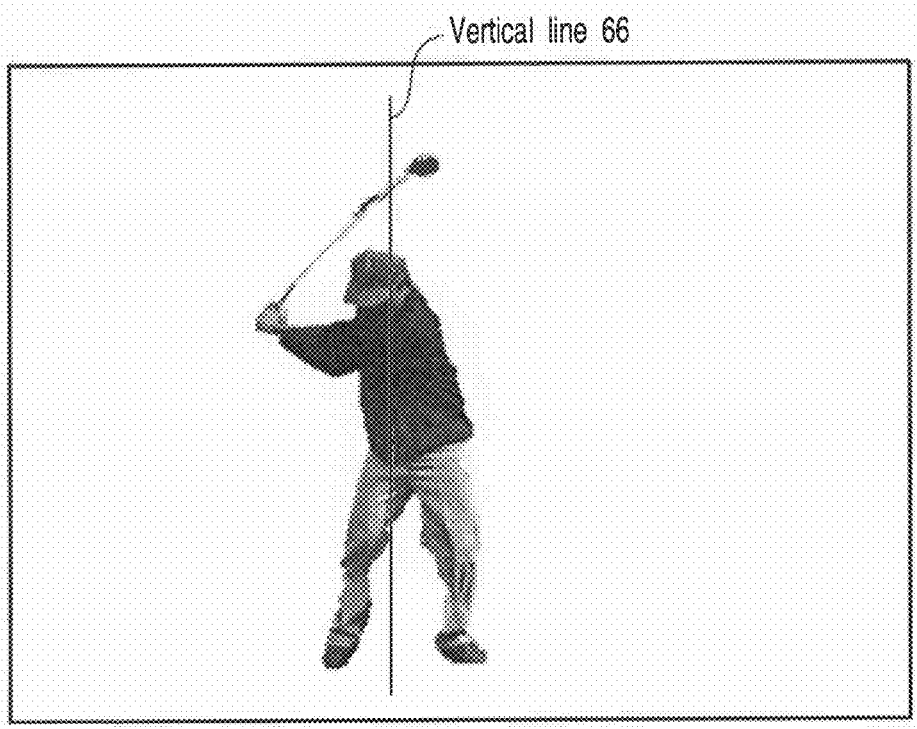
FIGS. 15A and 15B are views useful in explaining a horizontal-motion analysis performed in the motion analysis step of the second embodiment, utilizing changes in the center of gravity.
Figure 15B:
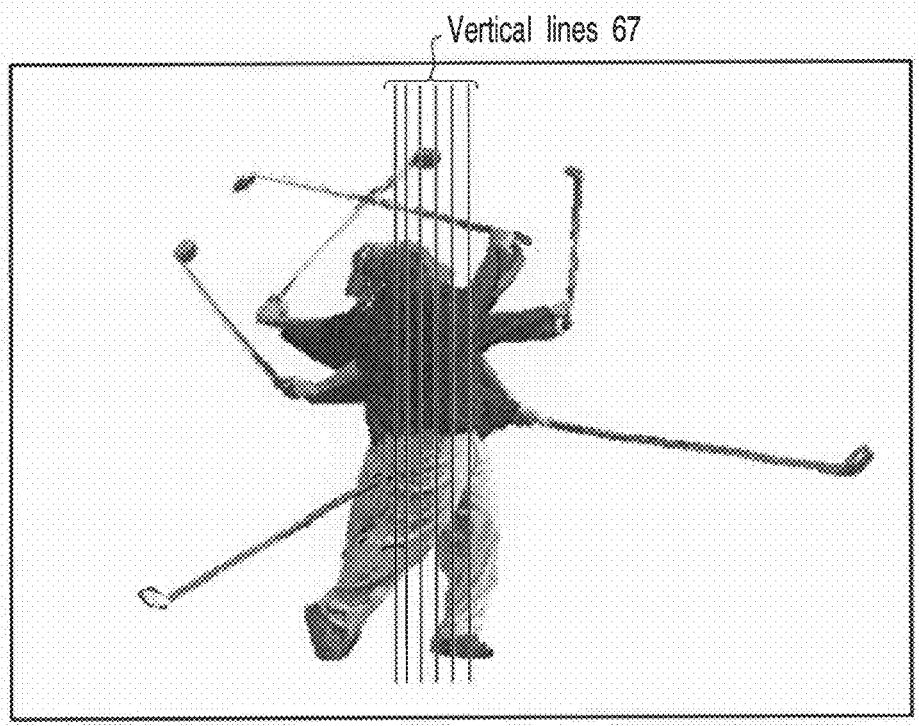

Furthermore, to enable horizontal changes in the position of the center of gravity to be confirmed, object image data can be displayed together with a vertical additional line that passes through the position of the center of gravity in the object region of the object image data. FIG. 15A (15B) shows the case where a vertical line 66 (vertical lines 67) that passes through the center-of-gravity point 60 (center-of-gravity point train 62) shown in FIG. 13A (13B) is added.

In addition, a dispersion value concerning the position of the center of gravity for each frame of time-series object image data can be obtained and displayed. If the displayed dispersion value is low, it is determined that changes in the position of the center of gravity fall within a narrow range, therefore the golf swing is stable. On the other hand, if the displayed dispersion value is high, it is determined that the range of changes in the position of the center of gravity is wide, therefore the golf swing is unstable.

Part of an object region can be detected utilizing, for example, color information contained in object image data. The motion analysis section 24 horizontally scans object image data, thereby generating a color histogram corresponding to each scanning line. In a color histogram for a head region, torso region or leg region, there is a tendency for a particular color to have a high value. For example, in the head region, the color of a cap or hair has a high value, while in the torso region, the color of clothing on the upper half of the body has a high value. The motion analysis section 24 detects, from the color histogram, a horizontal position at which a characterizing change in color occurs, and divides the object image at this horizontal position, thereby detecting a partial region corresponding to the head region or torso region. After that, the position of the center of gravity in each partial image is computed in the same manner as described above, whereby an image obtained by synthesizing each partial image with a center-of-gravity point indicative of the position of the center of gravity is displayed.

If the position of the center of gravity in each partial region (head region, torso region, etc.) is obtained in the same manner as in the entire object region (the entire player region), it can be used as useful data. Further, if, for example, the tip of a golf club is designated, the position of the club head is automatically computed.

As described above, in the second embodiment, the position of the center of gravity in an object region contained in extracted time-series object image data is detected and used for the motion analysis of an object corresponding to the object region. As a result, the motion of the object contained in time-series image data can be analyzed in a quantitatively manner.

Third Embodiment

Figure 16:
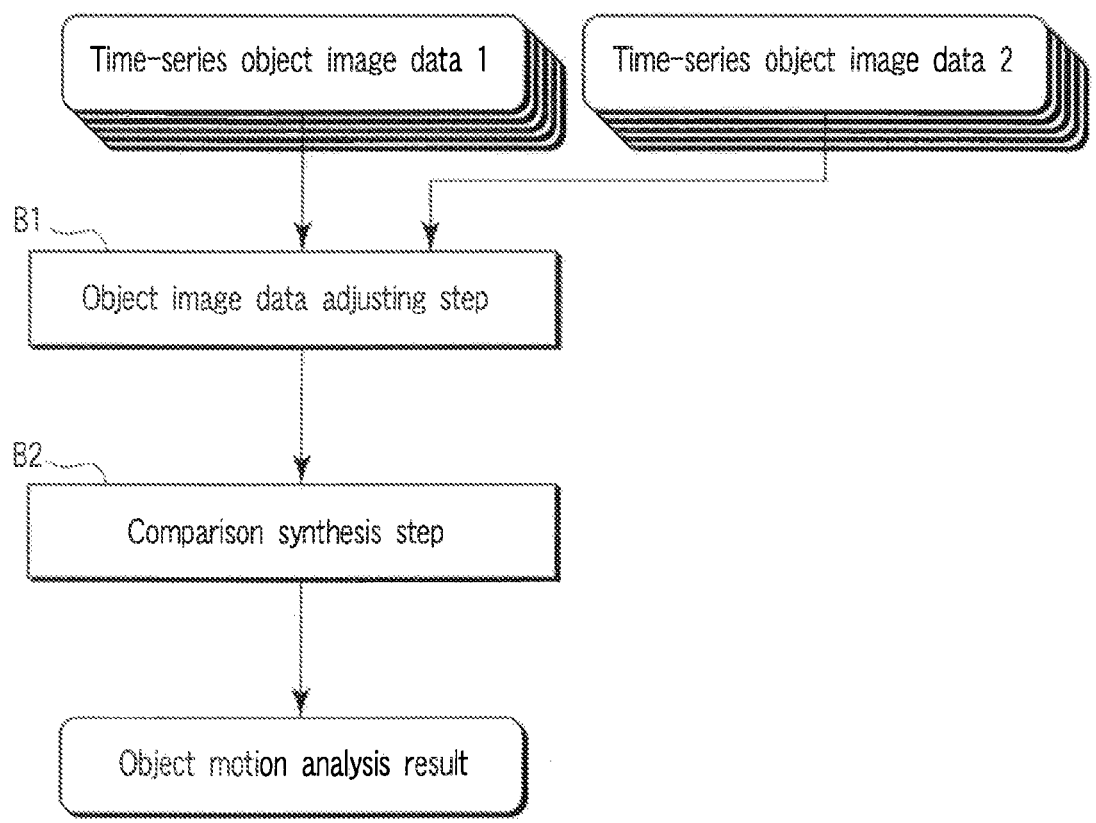
FIG. 16 is a flowchart useful in explaining a motion analysis step employed in a third embodiment.

FIG. 16 is a flowchart useful in explaining a motion analysis step (step A3) employed in an image analysis method according to a third embodiment. The third embodiment employs an image analysis method that comprises a motion analysis step (step A3) similar to that of the first embodiment. This motion analysis step includes an object image data adjusting step (step B1) and comparison synthesis step (step B2), which enables a quantitative analysis of the motion of an object from images thereof contained in time-series image data. At the step B1, second time-series object image data extracted from second time-series image data, which differs from first time-series object image data extracted from first time-series image data at the object extracting step in the first embodiment, is input and then adjusted so that it can be compared with the first time-series object image data. At the step B2, the first and second time-series object image data items are displayed parallel.

Figure 17A:
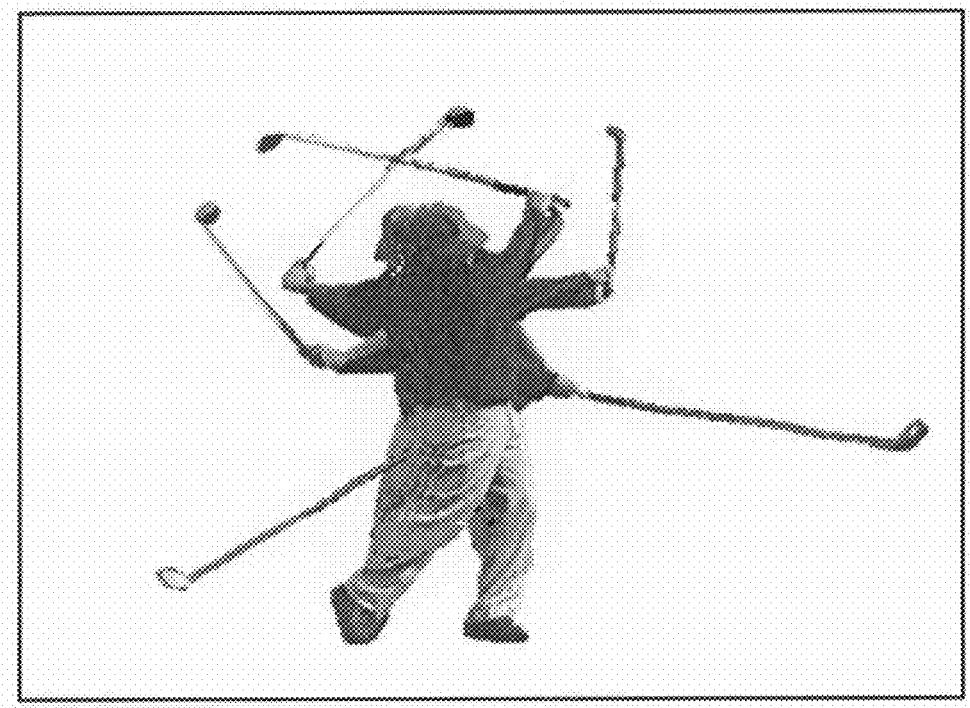
FIGS. 17A and 17B are views illustrating examples of first and second time-series object image data input in an object image data adjusting step employed in the third embodiment.
Figure 17B:
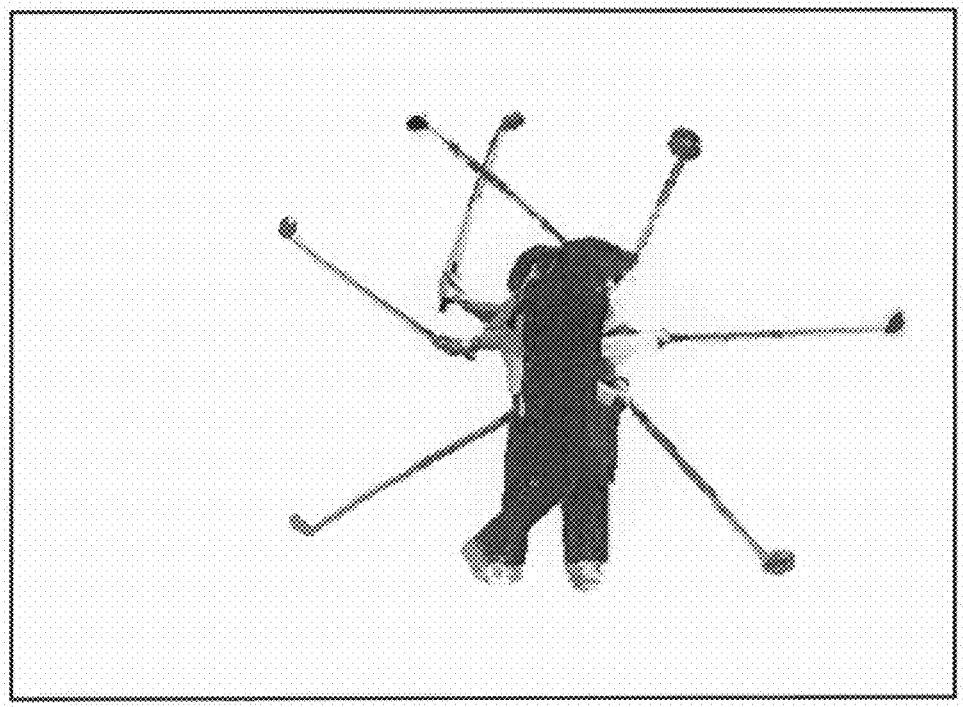

Specifically, the first time-series object image data shown in FIG. 17A and the second time-series object image data shown in FIG. 17B are input to the object image data adjusting section 26, where the object image data adjusting step (step B1) is executed.

In general, when the motions of different objects are photographed, the position or size differs between the objects, as illustrated in FIGS. 17A and 17B. Therefore, if the swings of a player assumed before and after lessons are compared, or if the swing of an instructed person is compared with that of an instructor, adjustment in position and/or size facilitates the comparison and hence quantitative motion analysis.

Figure 18A:
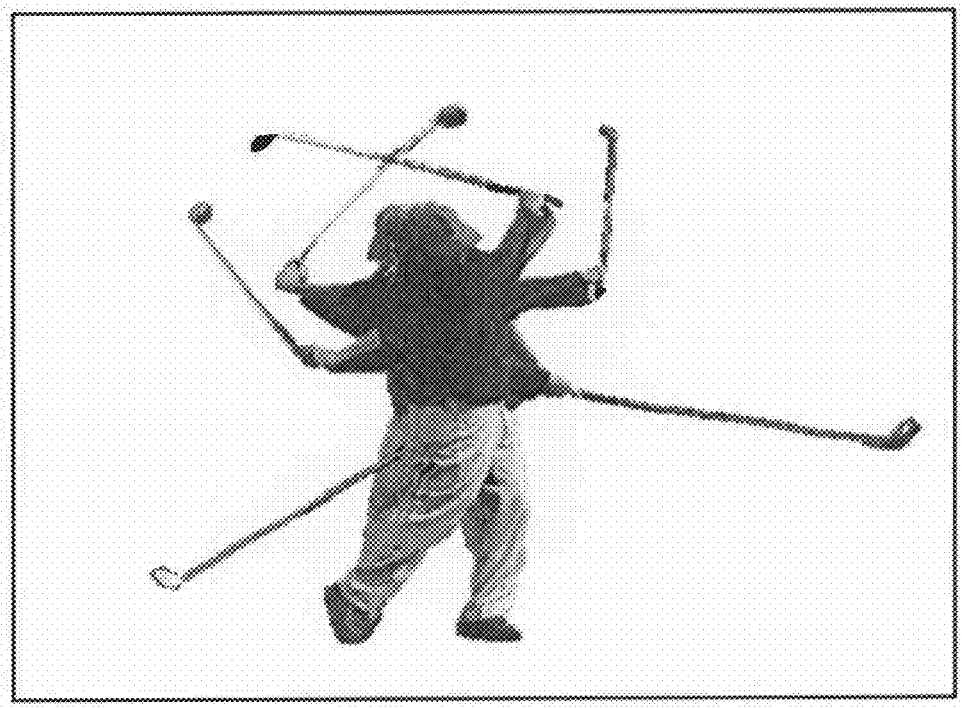
FIGS. 18A and 18B are views illustrating examples of first and second time-series object image data output in the object image data adjusting step employed in the third embodiment.
Figure 18B:
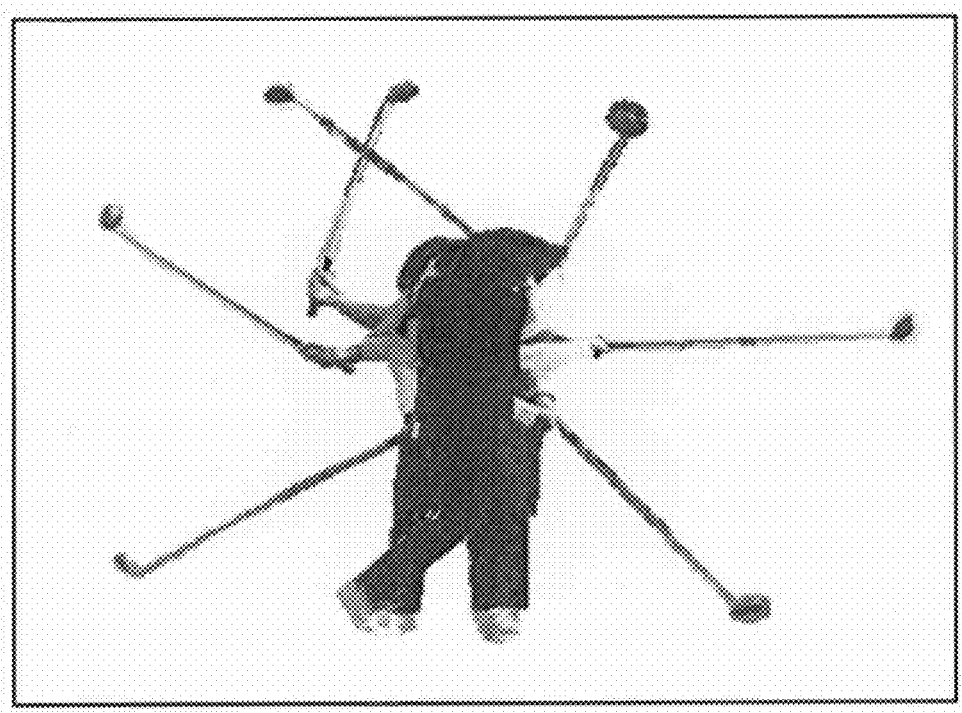

At the object image data adjusting step (step B1), first and second time-series object image data items are adjusted so that they can be compared with each other. Specifically, the positions and/or sizes of the objects are adjusted, the dominant hands of the objects are adjusted (reverse of images), etc. FIGS. 18A and 18B show examples of results of such adjustment.

The object in FIG. 17B is smaller than that of FIG. 17A and is situated closer to the right-hand of the screen than that of FIG. 17A. Therefore, the time-series object image data of FIG. 17B is subjected to size enlargement and leftward shift processing, thereby being adjusted to the time-series object image data of FIG. 18B that accords to the time-series object image data of FIG. 17A. As a result, the two time-series object image data items shown in FIGS. 18A and 18B can be easily compared, thereby facilitating the quantitative motion analysis.

The object image data adjusting section 26 can also perform time-based adjustment. For example, two time-series object image data items indicative of respective golf swings can be adjusted in time so that the ball-hitting moments during the swings can be simultaneously displayed. Further, if two time-series object image data items have different frame rates, a synthesizing technique, such as morphing, is used to obtain synthesized images free from time differences, which facilitates the comparison between the two time-series object image data items.

Furthermore, it is not necessary to limit the first and second time-series object image data items to object image data items corresponding to different objects. They may be time-series object image data items obtained by photographing one motion of a single object in different directions.

Although in the above description, first and second time-series object image data items corresponding to an object are compared to thereby analyze the motion of the object, the same analysis method as the above can be used for three or more time-series object image data items.

Figure 19:
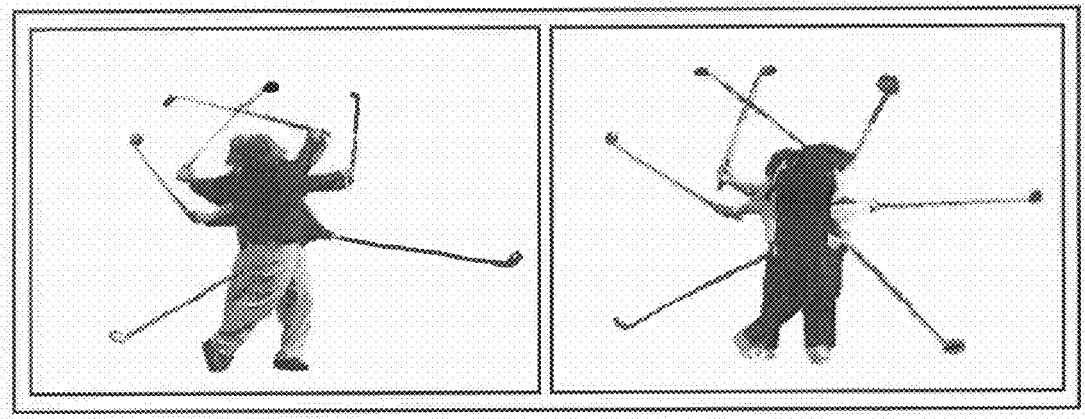
FIG. 19 is a view illustrating comparison synthesis display data output in a comparison synthesis step employed in the third embodiment.

After a first group of time-series object image data items are adjusted to a second group of time-series object image data to enable comparison therebetween at the object image data adjusting step (step B1), the first group of adjusted time-series object image data items are arranged in parallel with the second group of adjusted time-series object image data items, and in each group, the object image data items are superposed and synthesized. The synthesized images of the two groups are displayed as object motion analysis results on the display unit 14 as shown in FIG. 19.

As described above, in the third embodiment, a first group of time-series object image data items are adjusted to a second group of time-series object image data items to enable comparison therebetween, and the first group of time-series object image data items are synthesized and arranged in parallel with the second group of time-series object image data items similarly synthesized, thereby enabling a quantitative analysis of objects from images thereof contained in different groups of time-series object image data.

Fourth Embodiment

In the motion analysis step employed in the first embodiment, extracted time-series object image data items can be superposed and synthesized, while displaying, in the form of a line and/or dots, the trajectory of a particular point in an object region indicated by each extracted time-series object image data item.

Figure 20:
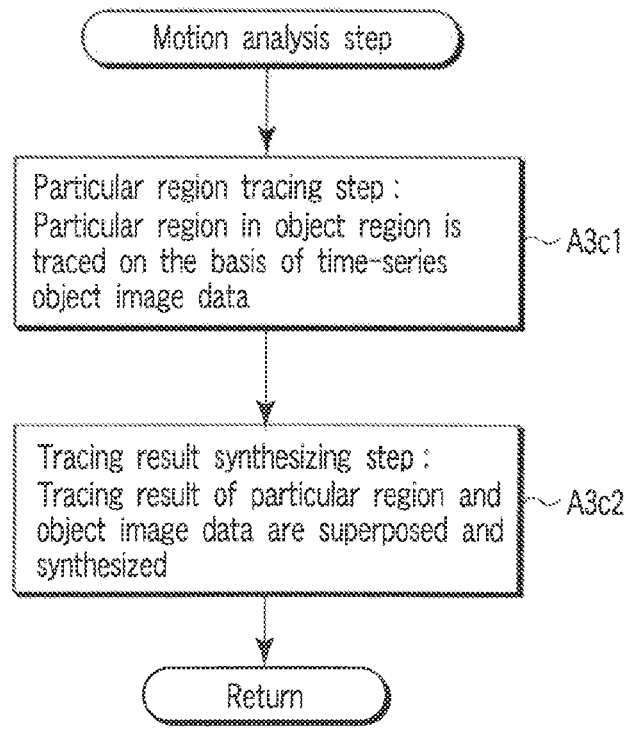
FIG. 20 is a flowchart useful in explaining a motion analysis step employed in a fourth embodiment.

FIG. 20 is a flowchart useful in explaining a motion analysis step employed in a fourth embodiment.

Figure 28:
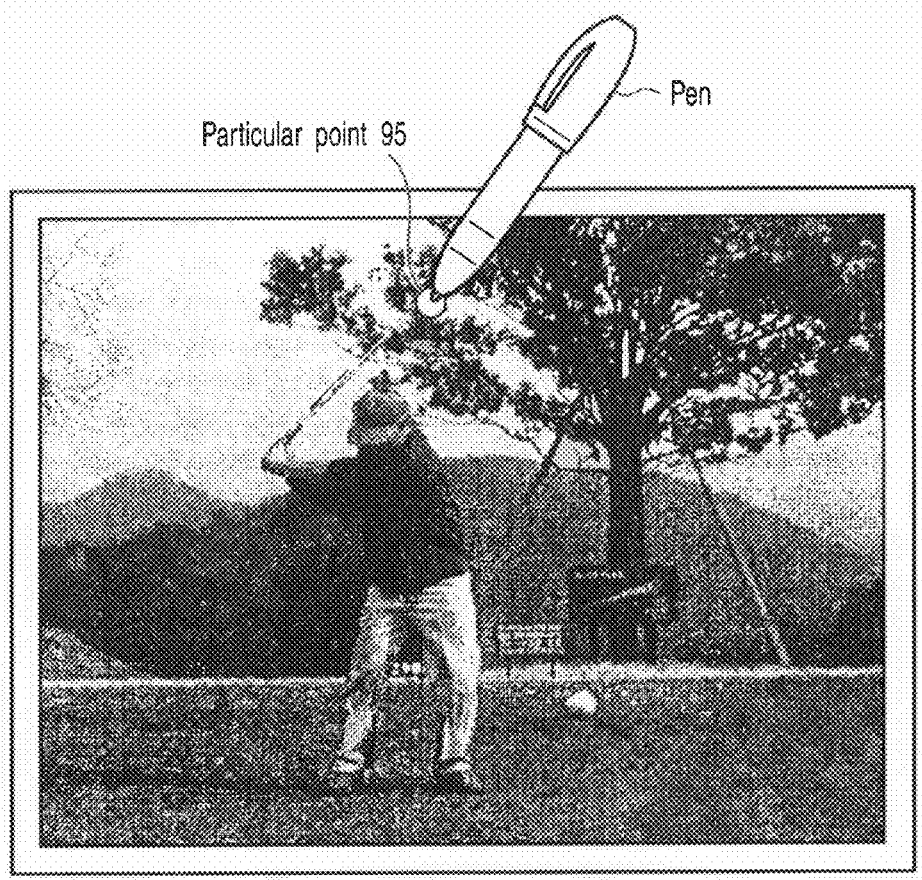
FIG. 28 is a view useful in explaining a particular point position setting step in a seventh embodiment.

Firstly, the motion analysis section 24 detects, in a particular region tracing step, a particular region from object image data extracted by the object region extracting section 22. For example, concerning object image data indicative of a golf swing, the head of a golf club is detected as the particular region. The head as the particular region is detected as the distal portion of an object region in the object image data corresponding to a golf club, or detected by directly pointing the head on the screen using a pointing device such as a graphic tablet, as is shown in FIG. 28 described later. The motion analysis section 24 detects the position of the particular region of each time-series object image data item, thereby tracing changes in the position of the particular region (step A3c1).

In a tracing result synthesizing step, the motion analysis section 24 adds a line and/or dots indicative of the trajectory 70 of the particular region, superposes time-series object image data items, and displays the resultant synthesis image on the display unit 14 (step A3c2).

Figure 21:
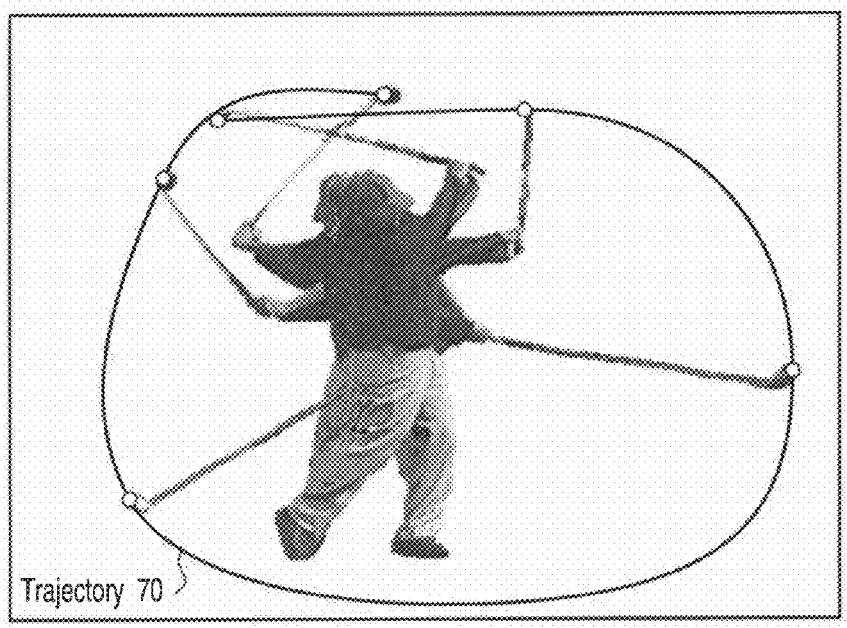
FIG. 21 is a view illustrating, using circular marks and lines, the trajectory of a particular point in the fourth embodiment.

FIG. 21 illustrates a case where the head of a golf club is considered to be a particular point in a golf swing, and time-series object image data items are superposed on each other and also synthesized with the trajectory of the particular point displayed using a line and circular marks. As seen from FIG. 21, the addition of the line and circular marks, indicative of the trajectory 70, to time-series object image data facilitates the understanding of the trajectory of the club head, and an analysis concerning the dimension, symmetry, etc. of a swing.

The particular region can be detected by the following method, as well as the above-described one. For example, the color of the particular region is pre-stored, and the region with the same color as the stored color is detected as a particular region from object image data. In the above-described example, the color of the club head is pre-registered, and the club head is detected as a particular region. The color designated as a particular region may be input by a user's manual operation through the input unit 12, or may be pointed on the display unit 14 using a pointing device (see a seventh embodiment).

Alternatively, the initial frame of time-series image data (object image data) may be displayed on the display unit 14, thereby causing a user to designate the position (region) to be set as a particular region on the frame by a manual operation. After that, on the basis of the color of the designated region, the particular region in the subsequent object image data may be traced.

Further, a zone (expected zone) in the form of, for example, a stripe, through which a particular region may pass, may be set in an image, thereby determining, as the particular region, a region of a predetermined size or more contained in the zone. In the case of a golf swing, a curved stripe zone, through which the head of a club is expected to pass, is set as an expected zone. The expected zone may be designated by a user's manual operation using the input unit 14 (pointing device), or may be predetermined to be a certain distance from an object image.

Furthermore, in the display example of FIG. 21, the point indicating a particular region and the line indicating the trajectory of this point are synthesized. However, another type of display can be employed. For example, an easily recognizable mark (figure) may be synthesized with a particular region (e.g., a club head). In addition, in FIG. 21, all items of time-series object image data are synthesized, and further, the trajectory 70 of a particular region extracted from each object image data item is synthesized with the synthesized object image data items. Alternatively, time-series object image data may be synthesized and displayed in units of frames. In this case, each time new object image data is synthesized and displayed, the object region in newly synthesized object image data is connected by a line to that in previously synthesized object image data, thereby generating the trajectory 70.

Although in the above description, a particular region is traced, a certain point in this region may be traced.

As described above, in the fourth embodiment, extracted time-series object image data items are superposed and synthesized while the trajectory of a particular point in an object region indicated by each extracted object image data item is displayed using a dot train or line, thereby enabling a quantitative analysis of the motion of an object from images thereof contained in time-series image data.

Fifth Embodiment

In the image analysis method for analyzing the movement of an object from images thereof contained in time-series image data, a change in a particular point in the object, such as the speed of movement or the curvature of the trajectory of the object, is computed from the movement of the particular point. For example, the motion analysis section 24 detects, in the motion analysis step, a particular point corresponding to a club head from object image data extracted by the object region extracting section 22 (in a manner similar to that employed in the fourth embodiment), thereby computing the movement speed or the curvature of the trajectory of the object from the detected particular point, and displaying the computation result as an object motion analysis result.

Figure 22:
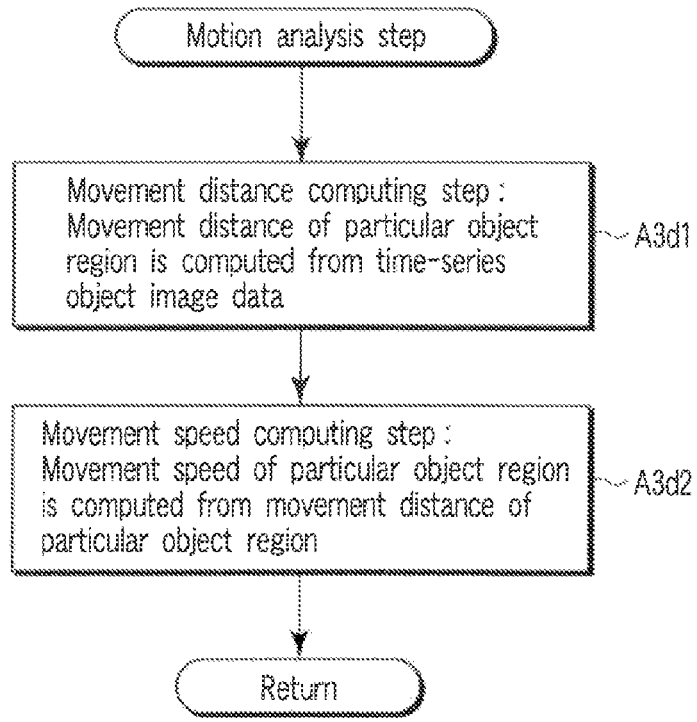
FIG. 22 is a flowchart useful in explaining a motion analysis step employed in a fifth embodiment.

FIG. 22 is a flowchart useful in explaining a motion analysis step employed in a fifth embodiment.

In a movement distance computing step (step A3d1), the motion analysis section 24 computes, from time-series object image data, the distance through which a particular region has moved. In the subsequent movement speed computing step (step A3d2), the motion analysis section 24 computes the movement speed of the particular region from the movement distance of the particular region computed at the movement distance computing step.

Figure 23:
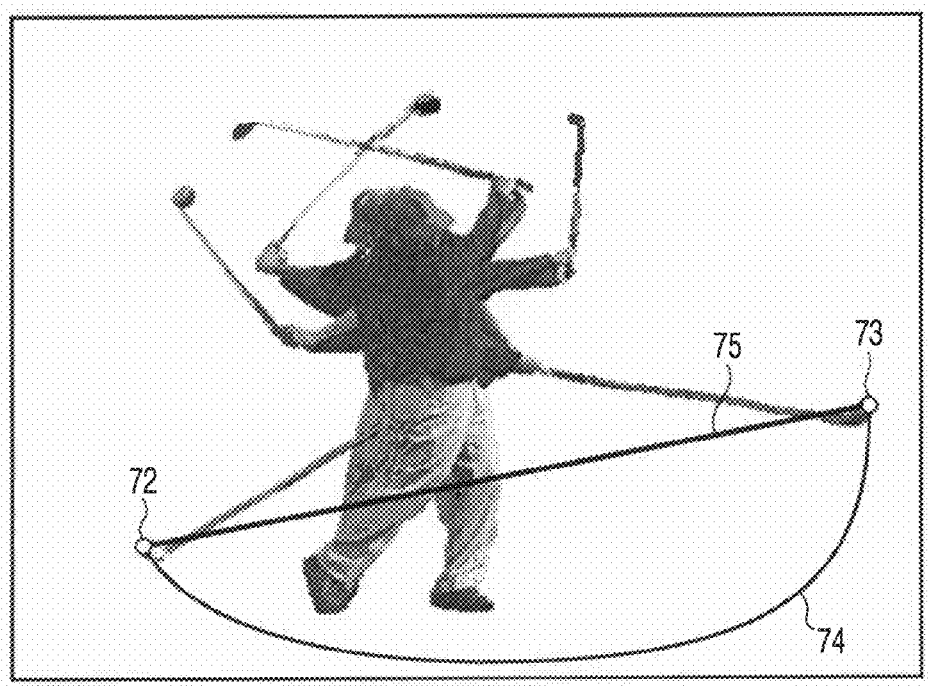
FIG. 23 is a view useful in explaining a head-speed measuring method employed in the fifth embodiment.

FIG. 23 is a view useful in explaining a method for measuring the head speed of a club regarded as an important motion analysis quantity in a golf swing motion. The head speed V is obtained as V=L/T [m/sec], L representing the movement distance L [m] of the club head within a predetermined time period T [sec]. The predetermined time period T [sec] in time-series object image data depends upon the frame rate of a camera, and is generally 1/30 [sec]. If both even and odd field images are used, the predetermined time period T [sec] is 1/60 [sec]. In either case, the predetermined time period T [sec] is a known value.

The distance through which the club head (particular point) moves corresponds to the distance between club head positions 72 and 73 in FIG. 23. Actually, the distance L through which the club head moves corresponds to the length of the trajectory 74 shown in FIG. 23. This can be computed from the club head positions 72 and 73.

Further, when the distance between club head positions of different time points is short, there is no problem even if the length 75 of the straight line that connects the club head positions 72 and 73 is approximated as the distance through which the club head moves. From the above, the distance L [m] through which the club head moves within the predetermined time period T [sec] is determined, thereby obtaining the head speed V=L/T [m/sec].

In the movement distance computing step, the following method can also be utilized.

For example, the motion analysis section 24 detects the position of a ball in an image, and detects object image data items that contain respective particular regions (indicating the club head) closest to the ball position on the left and right sides. On the basis of the positions of the particular regions of the two object image data items, the movement distance of the particular region is determined.

Alternatively, time-series object image data items may be superposed and displayed on the display unit 14, and a user may manually designate particular regions for computing the movement distance, using the input unit 12 (pointing device).

Furthermore, an absolute movement speed may be computed from a relative movement distance on an image.

For example, the height (cm) of a photographed player is input, and the number of pixels corresponding to the height of the player in an image (object image) is detected. On the basis of the ratio between the number of pixels corresponding to the movement distance of a particular region in the image, and the number of pixels corresponding to the height of the player, the actual movement distance (m) of the club head is computed. During a swing, the player may bend down or kneel. Accordingly, the height of the player in an image is lower than the actual height. To compensate for this, a coefficient value may be preset and the height of the player may be corrected beforehand using the coefficient value. Instead of inputting the height (m) of a photographed player, the height of an object region corresponding to the player may be preset to a certain value, thereby computing the movement distance of the club head in the same manner as the above. Further, instead of an object region corresponding to a player, the movement distance of the club head (particular region) may be computed in the same manner as the above on the basis of a dimension (e.g. the length) of the club head in an image. In this case, the dimension of the club head may be manually input by a user or may be set to a predetermined value.

In addition, a predetermined object region may be detected as a reference region from (e.g. the initial frame of) time-series image data, thereby computing the movement distance of the club head from the size of the reference region. For example, the region corresponding to a ball in an image is detected as the reference region. The golf ball has a predetermined size according to the golf rules, and is usually colored in white. Accordingly, a white circular region in an image is detected as a ball region. After that, the number of pixels corresponding to the diameter of the ball region is detected, whereby the actual movement distance (m) of the club head is computed on the basis of the ratio between the number of pixels corresponding to the diameter and the number of pixels by which a particular region in the image has moved.

Also, when a golf swing is photographed at a predetermined place, since the installation position of a camera and the position of a ball can be fixed, the size of a region corresponding to the ball in an image can be determined. On the basis of the predetermined size of the region corresponding to the ball, the movement distance of the club head can be computed in the same manner.

Figure 24:
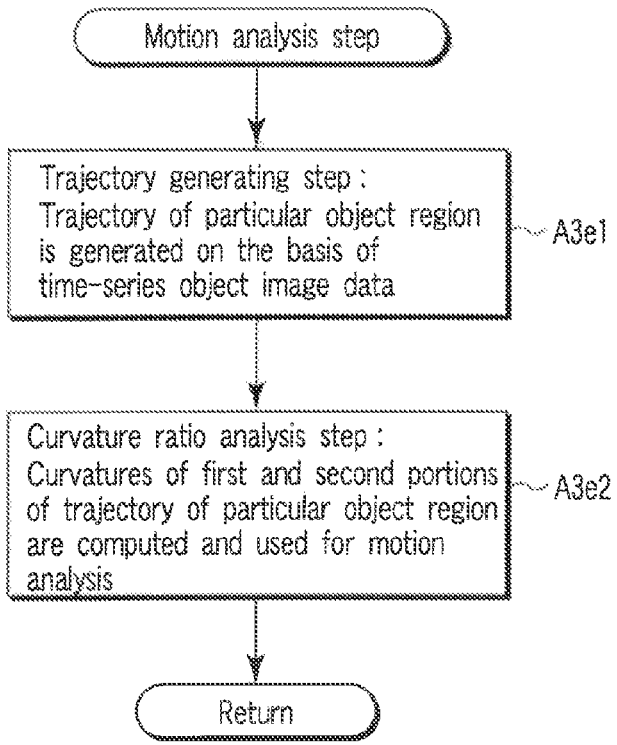
FIG. 24 is a flowchart useful in explaining another motion analysis step employed in a fifth embodiment.

FIG. 24 is a flowchart useful in explaining another motion analysis step employed in the fifth embodiment.

Firstly, in a trajectory generating step, the motion analysis section 24 generates, on the basis of time-series object image data, a trajectory that indicates changes in the position of a particular region (step A3*e*1). In the trajectory generating step, the method described referring to the flowchart of FIG. 20 can be utilized. In a subsequent curvature analysis step, the motion analysis section 24 computes the curvatures of portions of the trajectory generated at the trajectory generating step, thereby performing a motion analysis based on the computed curvature. Specifically, first and second curvatures corresponding to first and second portions of the trajectory generated at the trajectory generating step are computed, and performs a motion analysis on the basis of the ratio between the first and second curvatures (step A3*e*2).

Figure 25:
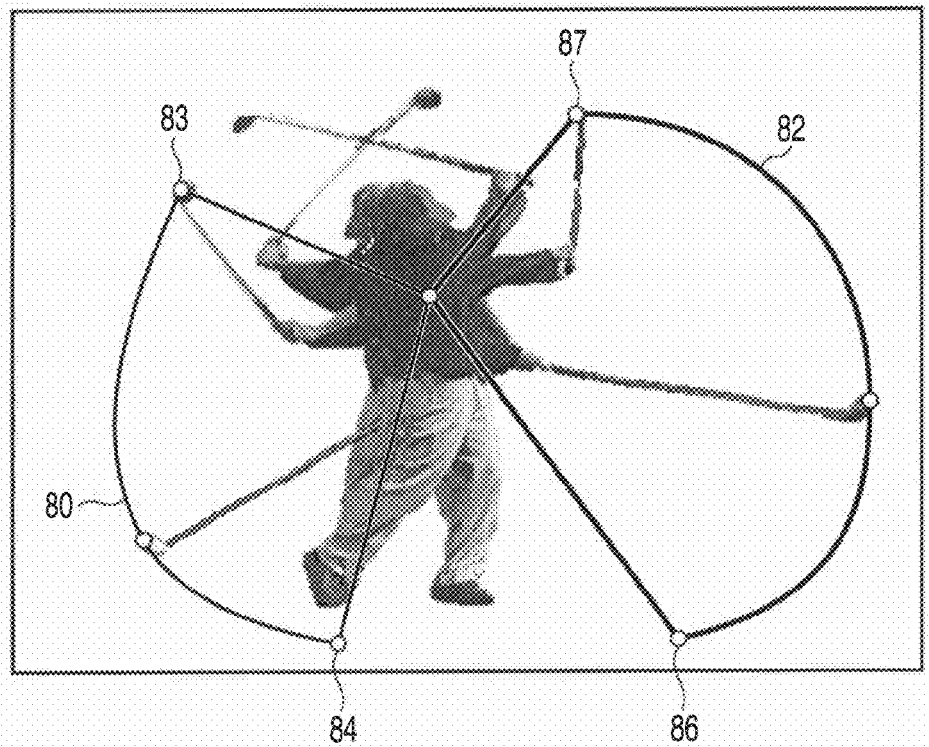
FIG. 25 is a view useful in explaining a method for measuring the curvature of a swing arc in the fifth embodiment.

FIG. 25 is a view useful in explaining a method for measuring the curvature of a swing arc as an important motion analysis quantity in a golf swing motion. The swing arc means an arc along which the club head moves. In general, it is stated that if the arc of a swing after the impact of the club and ball is wider than that from the beginning of the swing to the impact, the fly ball is stabilized and the carry is extended.

In light of this, the motion analysis section 24 computes, from a synthesized image, the curvature R1 (first curvature) of a first-half swing arc 80 and the curvature R2 (second curvature) of a second-half swing arc 82.

Specifically, the motion analysis section 24, for example, detects, as a reference point, a position in an object region, about which the club is swung, and computes the curvature R1 of the first-half swing arc 80 on the basis of the detected position of rotation and particular points 83 and 84 corresponding to the opposite ends of the first-half swing arc 80. Similarly, the motion analysis section 24 computes the curvature R2 of the second-half swing arc 82 on the basis of particular points 86 and 87 corresponding to the opposite ends of the second-half swing arc 82.

Although in the above description, the shoulder of a player is used as a reference point, another position, such as the position of the center of gravity computed from the initial frame of an object image, may be used as the reference point. Further, although in the above-described example, the swing arc before the impact position is compared with that after the impact position, the curvature ratio may be computed using any other portions of the trajectory. For example, a user may manually designate any portions of the trajectory in an image.

Further, the motion analysis section 24 can use the ratio between the curvatures R1 and R2 of the first-half and second-half swing arcs 80 and 82 as a parameter for quantitatively estimating the degree of maturity of a golf swing.

It is advisable for a user to perform swing exercises to establish a swing arc relationship of R1>>R2, while confirming the motion analysis results of the motion analysis section 24.

As described above, in the fifth embodiment, the movement speed of a particular point in an object or the curvature of the trajectory of the particular point is computed from the movement of the particular point in the object, images of the object being contained in time-series image data. As a result, the movement of the object can be quantitatively analyzed.

Although the fifth embodiment employs the object image extracting step (step A2) at which time-series object image data is extracted, this step can be omitted if the trajectory of a particular region is computed from time-series image data.

For example, the method (particular region tracing step) described in the fourth embodiment is executed using time-series image data as a target. This enables the trajectory of a particular region corresponding to a club head to be obtained from time-series image data. After that, the movement speed of the particular region, the curvature of the trajectory of the region, and the curvature ratio between portions of the trajectory can be computed as in the fifth embodiment.

In this case, the motion analysis section 24 uses, for example, the movement speed of the particular region, the curvature of the trajectory of the region, and the curvature ratio as estimation values for determining whether or not a golf swing is good. The motion analysis section 24 compares the estimation values with preset reference values, thereby estimating the motion of an object image, i.e., the golf swing, and displaying an analysis result based on the estimation.

For example, the golf swing may be estimated to be good if the computed curvature ratio indicates that the first curvature R1 is greater than the second curvature R2, whereby a message indicative of this estimation may be displayed on the display unit 14 as an analysis result.

Sixth Embodiment

In the image analysis method for analyzing the movement of an object from images thereof contained in time-series image data, the characterizing amount of a closed region defined by the trajectory of a particular point in the object, such as the area of the region, or the inclination of the trajectory, is computed from the movement of the particular point. For example, the motion analysis section 24 detects, in the motion analysis step, a particular point from object image data extracted by the object region extracting section 22 (in a manner similar to that employed in the fourth embodiment), thereby obtaining a closed region defined by the trajectory of the detected particular point, also computing the area of the closed region or the inclination of the trajectory, and displaying the computation result as an object motion analysis result.

Figure 26:
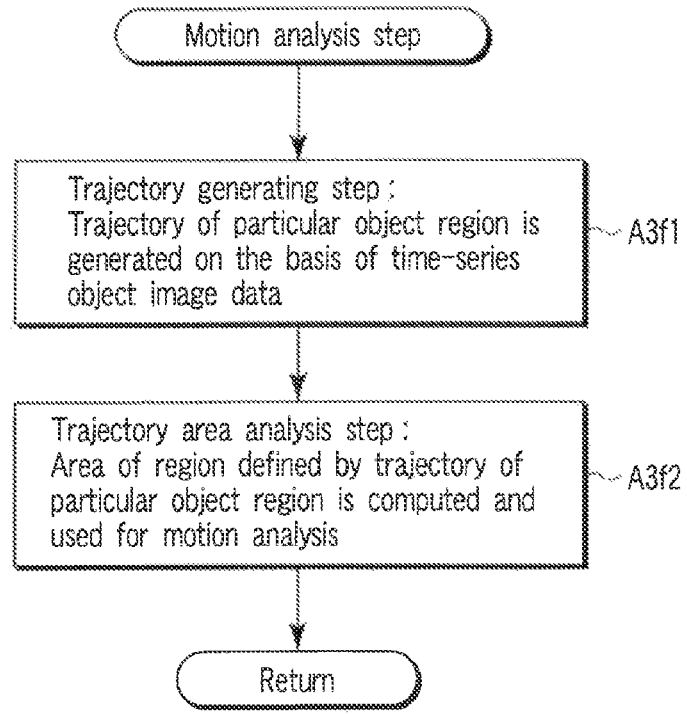
FIG. 26 is a flowchart useful in explaining a motion analysis step employed in a sixth embodiment.

FIG. 26 is a flowchart useful in explaining another motion analysis step employed in the sixth embodiment.

The motion analysis section 24 generates, in a trajectory generating step, a trajectory indicative of changes in the position of a particular region on the basis of time-series object image data (step A3/1). The trajectory generating step can employ the method illustrated in the flowchart of FIG. 2. In a trajectory area analysis step, the motion analysis section 24 computes the area of the region defined by the trajectory generated at the trajectory generating step, and performs a motion analysis on the basis of the computed area (step A3/2).

Figure 27:
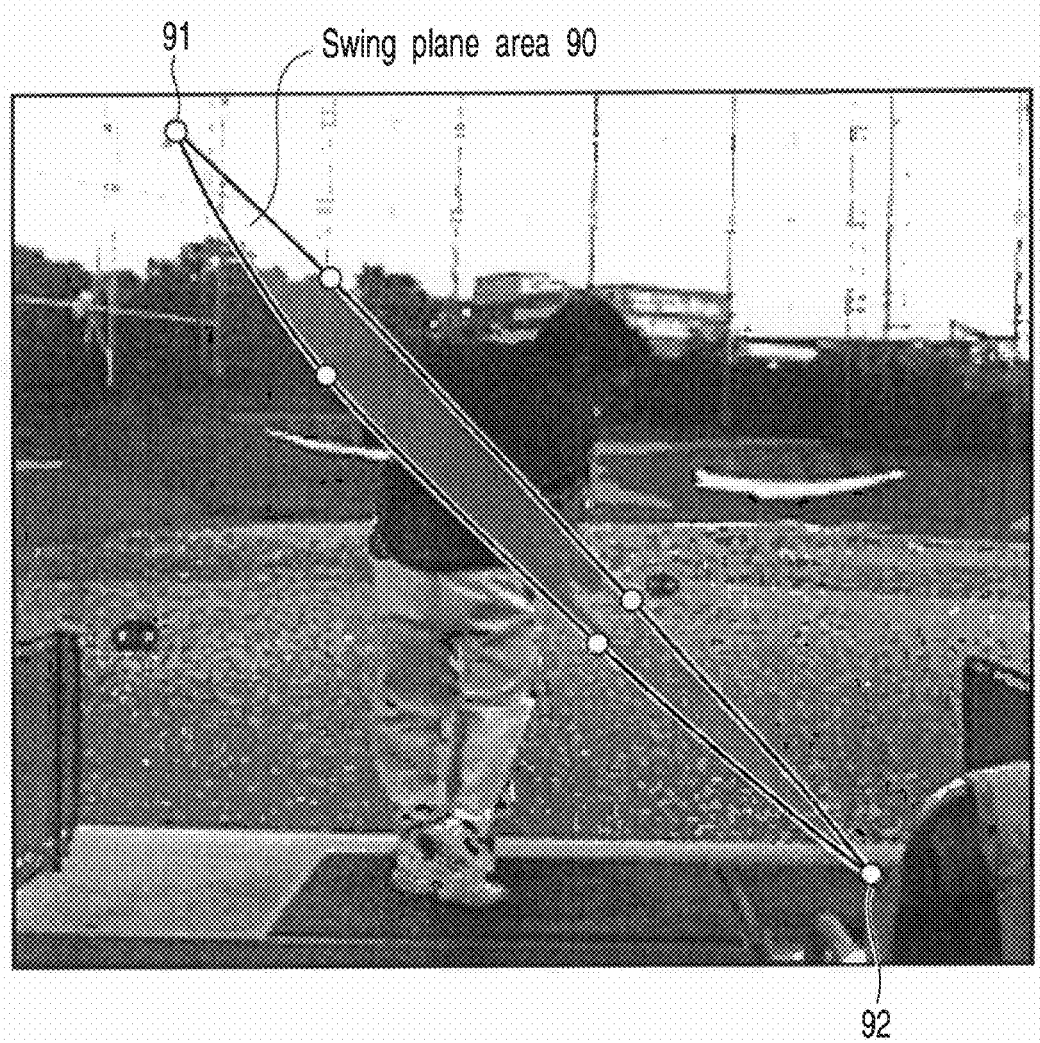
FIG. 27 is a view useful in explaining a method for measuring the area and inclination of a swing plane in the sixth embodiment.

FIG. 27 is a view useful in explaining a method for measuring the area and inclination of a swing plane as an important motion analysis parameter in a golf swing motion. The swing plane means a plane defined by the trajectory of a line segment that moves during a golf swing motion, the line segment being defined by the arms of a player, club shaft and club head (or club shaft and club head).

In general, it is considered that the narrower (i.e., the closer to a line) the swing plane when viewed from behind, the better the swing.

In this embodiment, time-series data obtained by photographing a swing from behind as shown in FIG. 27 is subjected to an image analysis.

The motion analysis section 24 detects a particular point corresponding to a club head from object image data extracted by the object region extracting section 22 (in a manner similar to that employed in the fourth embodiment), thereby obtaining a closed region defined by the trajectory of the detected particular point, i.e., the swing plane area 90 as shown in FIG. 27. The swing plane area 90 may be detected from either the entire swing plane or a portion of the swing plane. For example, in the case of FIG. 27, assume that the detected swing plane area 90 is defined by the trajectory of the aforementioned line segment during the motion of Top→Down swing→Impact→Follow through. In addition to the display of the swing plane area 90 as shown in FIG. 27, the motion analysis section 24 measures the area S of the swing plane area 90 and displays the area S as an object motion analysis result. The area S can be used as a parameter for quantitatively estimating the degree of maturity of a golf swing.

It is advisable for a user to perform golf swing exercises to make the area S of the swing plane area 90 closer to 0, while confirming the motion analysis result of the motion analysis section 24.

Further, the inclination of the swing plane in FIG. 27 is another important motion analysis parameter in a golf swing motion. If the inclination is close to 90°, the swing is called "an upright swing". Further, if the inclination is too close to 0°, the swing is estimated to be bad. It is useful in a golf motion analysis to measure the inclination and compare it with a reference value.

The motion analysis section 24 detects, from particular points contained in object image data, an uppermost particular point 91 and lowermost particular point 92, for example, and computes the inclination of the swing plane from the particular points 91 and 92.

If it is detected that the trajectory of a particular point has an intersection, it can be determined from the trajectory whether the swing is an "outside-in" or "inside-out" swing. Furthermore, when a swing of a right-handed player is photographed, if the trajectory of a particular point travels clockwise, it is detected that the swing is an "outside-in" swing, while if the trajectory of a particular point travels counterclockwise, it is detected that the swing is an "inside-out" swing (see FIG. 32). This detection result can be displayed as a swing analysis result.

As described above, in the sixth embodiment, the area of a closed region defined by the trajectory of a particular point of an object whose images are contained in time-series image data, or the inclination of the trajectory is computed from the movement of the particular point, thereby enabling the motion of the object to be quantitatively analyzed.

Although the sixth embodiment employs the object image extracting step (step A2) at which time-series object image data is extracted, this step can be omitted if the trajectory of a particular region is computed from time-series image data, and the area of a closed region defined by the trajectory is computed.

For example, the method (particular region tracing step) described in the fourth embodiment is executed using time-series image data as a target. This enables the trajectory of a particular region corresponding to a club head to be obtained from time-series image data. After that, the area of the closed region defined by the trajectory of the particular region can be computed as in the sixth embodiment.

In this case, the motion analysis section 24 uses, for example, the area of the closed region defined by the trajectory of the particular region, as an estimation value for determining whether or not a golf swing is good. The motion analysis section 24 compares the estimation value with a preset reference value, thereby estimating the golf swing, and displaying an analysis result based on the estimation.

Seventh Embodiment

In the time-series image data input step employed in the first embodiment, in order to set the position of a particular point used for a motion analysis, a characterizing color can be beforehand attached to a particular point in an object to be photographed, or the position of the particular point in the object can be measured while picking up image data concerning the object.

For example, if, in the time-series image data input section 20, the head of a golf club is marked in red and the globes of a player are marked in yellow, the object region extracting section 22 can automatically detect a particular point from time-series image data at the object region extracting step, by executing image processing for detection of colors in an image.

The particular point detection can be performed without image processing. For example, if time-series image data and range data are simultaneously acquired using an instrument such as a range finder, or if a motion capture device capable of position detection is installed in a club head, a particular point in an object can be detected.

In addition, a user can input a particular point in an object if the object region extracting step performed by the object region extracting section 22 in the first embodiment incorporates an object image data generating step for extracting an object region from time-series image data, and a particular point position setting step for enabling users to designate and set the position of a particular point in the extracted object region.

FIG. 28 is a view useful in explaining the particular point position setting step. At the particular point position setting step, the object region extracting section 22 causes an image (for example, an initial frame image) for designating a particular point to be displayed, as is shown in FIG. 28.

At this time, a user uses a pointing device, such as a mouse or graphic tablet, to designate a particular point position in object image data contained in an image. As a result, the object region extracting section 22 inputs the particular point position for a motion analysis. After that, the section 22 marks, in a predetermined color (e.g., red), an object region corresponding to the particular point position.

As described above, in the seventh embodiment, a particular point position used for a motion analysis can be obtained from time-series object image data, with the result that an object whose images are contained in time-series image data can be analyzed quantitatively.

Eighth Embodiment

Figure 29:
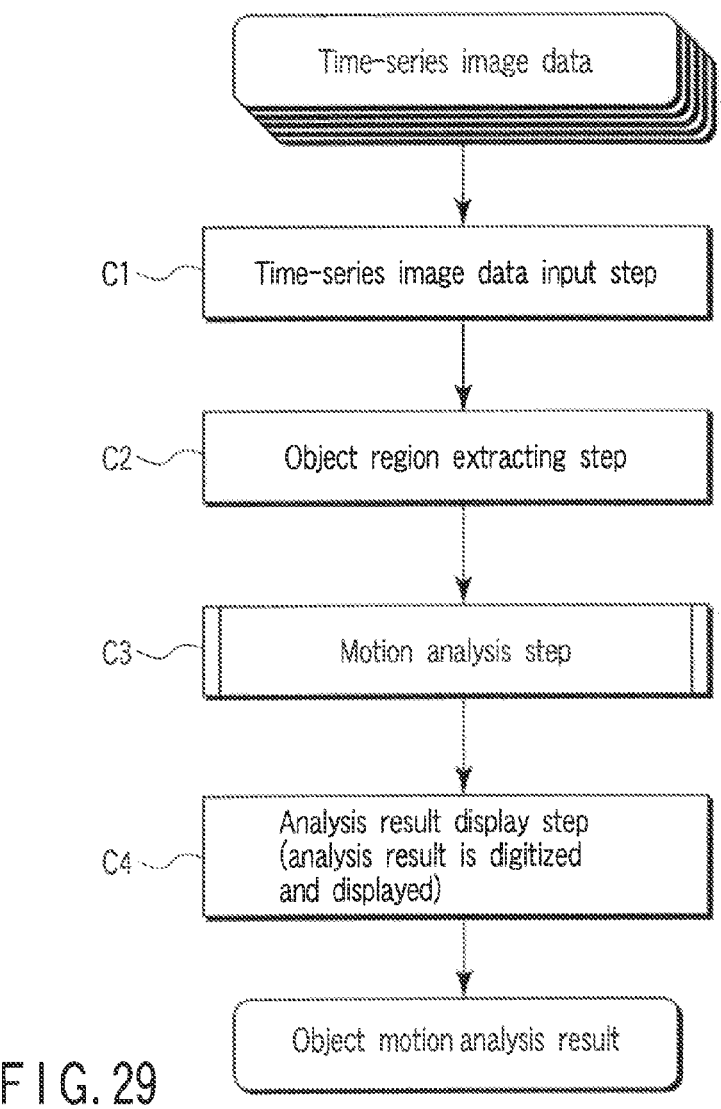
FIG. 29 is a flowchart useful in explaining an image analysis method according to an eighth embodiment.

FIG. 29 is a flowchart useful in explaining an image analysis method according to an eighth embodiment. In FIG. 29, step C1 is a time-series image data input step for inputting time-series image data. Step C2 is an object region extracting step for extracting an object region from the time-series image data and generating time-series object image data. Step C3 is a motion analysis step for analyzing the motion of an object on the basis of shape information contained in the generated time-series object image data. The steps C1-C3 are the same as the steps A1-A3 employed in the first to seventh embodiments. Further, step C4 is an analysis result display step for digitizing an analysis result and displaying it.

Firstly, at the time-series image data input step (step C1), time-series image data is obtained by image pickup means such as a video camera, and is input. Subsequently, at the object region extracting step (step C2), an object region is extracted from the time-series image data, thereby generating time-series object image data. At the motion analysis step (step C3), a motion analysis of an object is performed on the basis of the shape information contained in the extracted time-series object image data. Lastly, at the analysis result display step (step C4), the motion analysis result obtained at the motion analysis step (step C3) is digitized and displayed.

Figure 30:
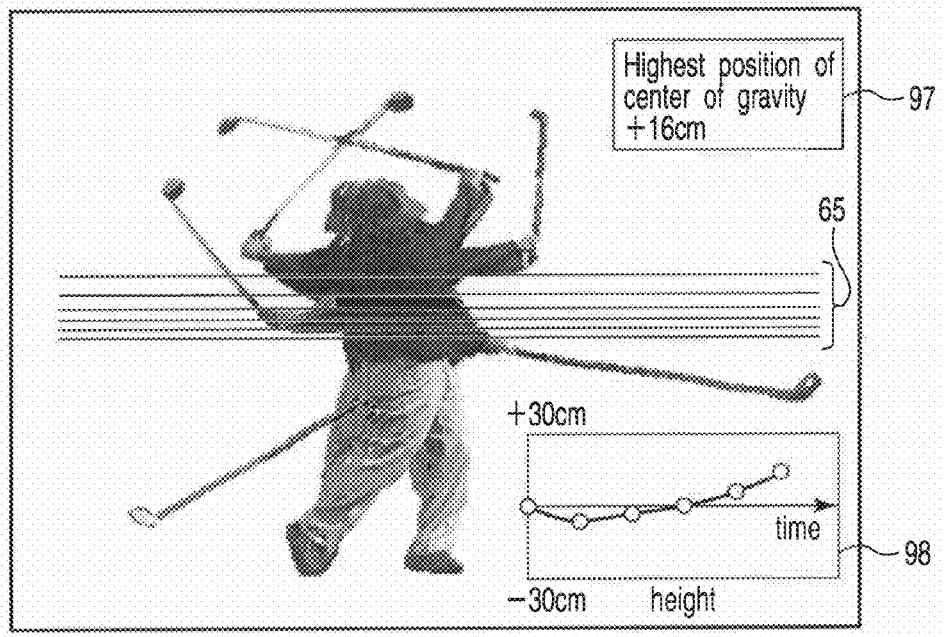
FIG. 30 is a view illustrating changes in the center of gravity in the eighth embodiment, utilizing a numerical value and a graph.

For example, as described in the second embodiment, in the motion analysis method for detecting the position of the center of gravity in an object region, vertical (or horizontal) changes in the center of gravity can be displayed using a numerical value or graph as shown in FIG. 30 at the analysis result display step by the analysis result display section 30. In the example of FIG. 30, there are provided an area 97 for displaying the highest position of the center of gravity, and an area 98 for displaying a graph indicative of vertical changes with time in the center of gravity.

Further, also in the case of computing, from the movement of a particular point of an object whose images are contained in time-series image data, the movement speed of the particular point, the curvature of the trajectory of the particular point, the area of the closed region defined by the trajectory of the particular point, and/or the inclination of the trajectory (swing plane) of the particular point, the computed values can be displayed directly or using a graph, as is described in the fifth and sixth embodiments.

Figure 31:
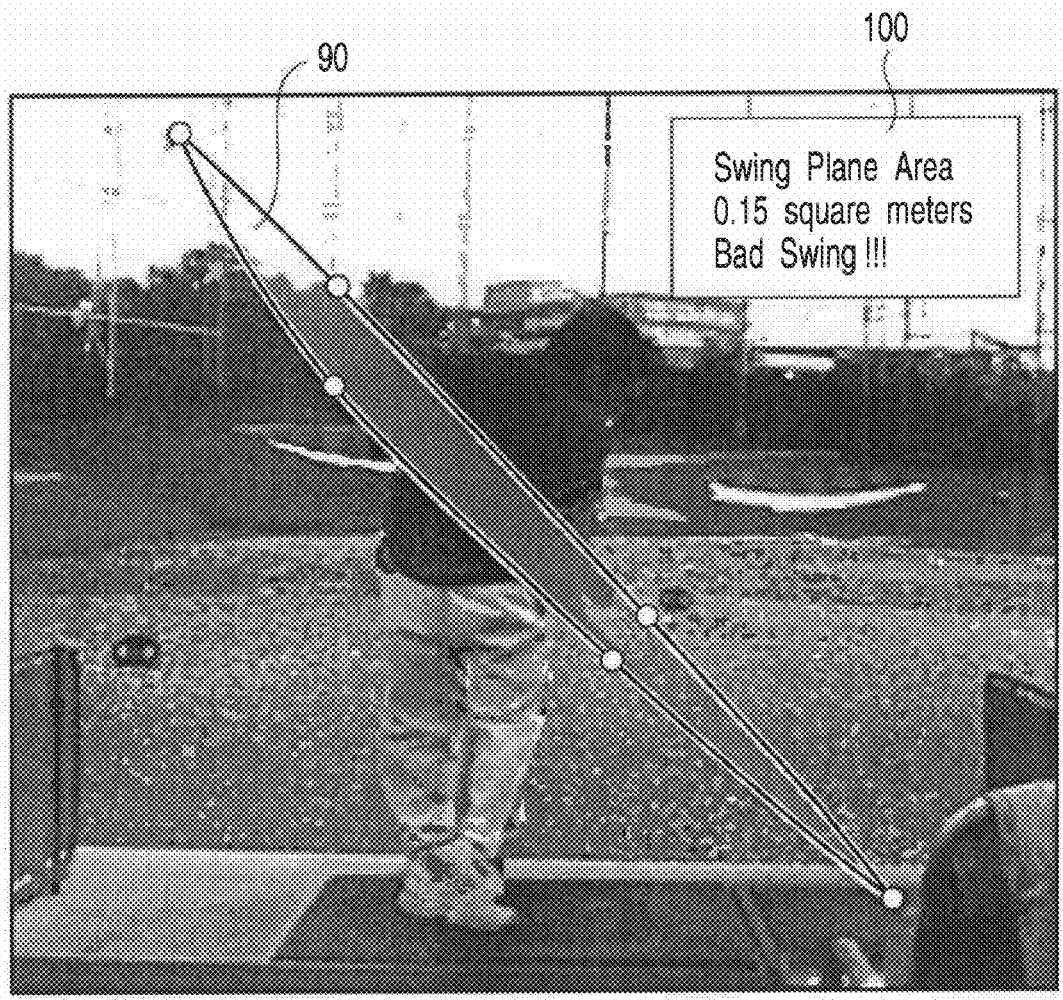
FIG. 31 is a view illustrating the area of a swing plane in the eighth embodiment, utilizing a numerical value.

FIG. 31 illustrates a display example where the area S of the swing plane area 90 is displayed on the display screen shown in FIG. 27 that is used in the sixth embodiment, and an area 100 is provided for displaying a swing estimation result (analysis result) obtained on the basis of the area S.

To estimate a swing analysis result, personal data concerning a player or golf club stored as time-series image data may be pre-registered and used for a swing estimation. According to, for example, the height of a player, the length of the hands of the player, and/or the length of a golf club, the area S of the swing plane area 90, the inclination of the swing plane, or the shapes of swing arcs (first-half arc, second-half arc) as estimation standards vary.

The analysis result display section 30 changes the estimation standards in accordance with personal data, performs estimation on the basis of the changed estimation standards, and displays the estimation result in, for example, the area 100.

Further, the analysis result display section 30 may display the trajectory of a particular point obtained by the motion analysis section 24, in accordance with the direction of the movement of the particular point. For example, as described in the sixth embodiment, if the motion analysis section 24 has detected that the trajectory of the particular point travels clockwise or counterclockwise, therefore that the swing is an "inside-out" swing or "outside-in" swing, the detection result is displayed as an analysis result in the area 100.

Figures 32A, 32B:
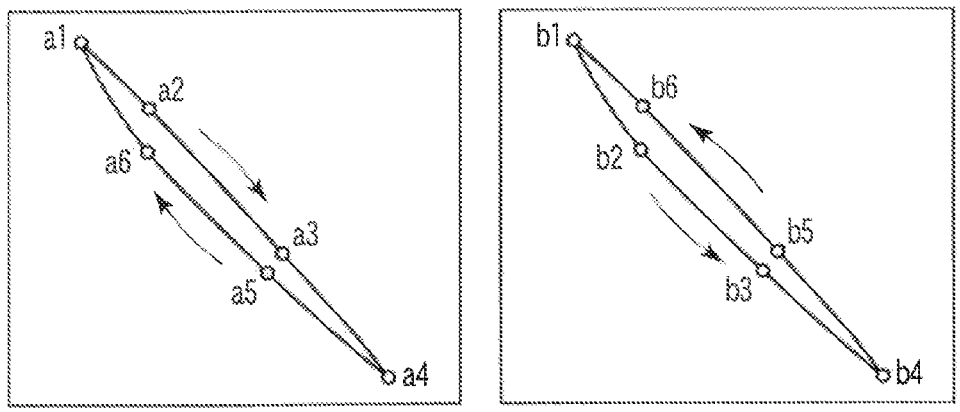
FIGS. 32A and 32B are views useful in explaining changes in the position of a particular point on a trajectory.

Whether the swing is an "inside-out" swing or "outside-in" swing is determined by analyzing changes in the position of the particular point on the trajectory as shown in FIGS. 32A and 32B, using the motion analysis section 24. FIGS. 32A and 32B are views useful in explaining changes in the position (Top→Down swing→Impact→Follow through) of the particular point that appears in FIG. 31. In the case of FIG. 32A, the particular point moves in the order of a1, a2, a3, a4, a5, a6 and a1, i.e., it travels clockwise. In this case, the golf club is swung down from the outside and is followed through to the inside. Therefore, the swing is analyzed to be an "outside-in" swing. In the case of FIG. 32B, the particular point moves in the order of b1, b2, b3, b4, b5, b6 and b1, i.e., it travels counterclockwise. In this case, the golf club is swung down from the inside and is followed through to the outside. Therefore, the swing is analyzed to be an "inside-out" swing.

If the motion analysis section 24 determines that the swing is either an "inside-out" swing or an "outside-in" swing, the analysis result display section 30 can display the swing plane area 90 in a color corresponding to the swing.

Also, the analysis result display section 30 can display the trajectory during a "down swing" and that during a "follow through" in respective colors.

As described above, in the eighth embodiment, the motion analysis result of an object is displayed using a numerical value or graph. Thus, the motion of the object can be quantitatively analyzed from images thereof contained in time-series image data.

The respective image analysis methods described in the first to eighth embodiments can be combined appropriately.

Furthermore, the methods described in the above embodiments can be written, as image analysis programs that can be executed in a computer, to various recording mediums such as a magnetic disk (flexible disk, hard disk, etc.), an optical disk (CD-ROM, DVD, etc.), a semiconductor memory, etc., whereby the methods can be provided for various apparatuses. In addition, the methods can be transmitted to various apparatuses via a communication medium. Computers for realizing the methods read an image analysis program stored in a recording medium, or receives a program via a communication medium, thereby performing the above-described processes under the control of the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image analysis method comprising:
    using a computer to perform the following operations of:
    inputting time-series image data;
    generating time-series object image data by extracting object regions from the time-series image data, wherein the object regions are extracted such that differences between frames of the time-series image data are computed, and regions of large differences are digitized;
    computing a position of a center of gravity in each of the object regions, to thereby compute multiple respective centers of gravity;
    synthesizing, for each of the multiple centers of gravity, a respective additional line indicative of the position of a respective of the multiple centers of gravity, with the object image data; and
    analyzing motion of an object from the time-series object image data.

2. The method according to claim 1, wherein the analyzing includes:
    adjusting a first time-series object image data and a second time-series object image data by performing deforming processing on at least one of the first time-series object image data and the second time-series object image data; and
    superposing and synthesizing the first time-series object image data and the second time-series object image data after the deforming processing.

* * * * *